(12) United States Patent
Ohno et al.

(10) Patent No.: US 10,956,149 B2
(45) Date of Patent: Mar. 23, 2021

(54) PROCESS CONTROL SYSTEM, PROCESS CONTROL APPARATUS AND PROGRAM UPDATE METHOD

(71) Applicant: Yokogawa Electric Corporation, Musashino (JP)

(72) Inventors: Takeshi Ohno, Musashino (JP); Takeshi Murakami, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 16/582,184

(22) Filed: Sep. 25, 2019

(65) Prior Publication Data

US 2020/0097282 A1 Mar. 26, 2020

(30) Foreign Application Priority Data

Sep. 26, 2018 (JP) ................................ 2018-180715

(51) Int. Cl.
*G06F 9/44* (2018.01)
*G06F 8/656* (2018.01)
*G06F 8/658* (2018.01)
*G06F 9/455* (2018.01)

(52) U.S. Cl.
CPC .............. *G06F 8/656* (2018.02); *G06F 8/658* (2018.02); *G06F 9/45533* (2013.01); *G06F 2009/45575* (2013.01)

(58) Field of Classification Search
None
See application file for complete search history.

(56) References Cited

U.S. PATENT DOCUMENTS

| 2013/0253671 | A1 | 9/2013 | Torigoe |
| 2014/0379134 | A1 | 12/2014 | Tsuchiya et al. |
| 2017/0139698 | A1 | 5/2017 | Muroyama et al. |

FOREIGN PATENT DOCUMENTS

| EP | 2897007 A1 | 7/2015 |
| JP | 11-3240 A | 1/1999 |
| JP | 2013-200669 A | 10/2013 |
| JP | 2015-5258 A | 1/2015 |
| JP | 5834935 B2 | 12/2015 |
| JP | 2018-014046 A | 1/2018 |

OTHER PUBLICATIONS

Communication dated Feb. 13, 2020, from the European Patent Office in counterpart European Application No. 19199635.4.
Communication dated May 27, 2020, from the European Patent Office in counterpart European Application No. 19199635.4.

*Primary Examiner* — Anna C Deng
(74) *Attorney, Agent, or Firm* — Sughrue Mion, PLLC

(57) ABSTRACT

A first process control apparatus in a process control system executes a non-update target program which is not an update target and an update target program which may be the update target, pauses the non-update target program based on a pause request from an outside, and transfers a context of the non-update target program to a second process control apparatus. The second process control apparatus in the process control system executes the non-update target program which is not the update target and an update target program after update, restores a context of the non-update target program by using the transferred context, initializes a context of the update target program, and causes the second program execution unit to resume the non-update target program and the update target program, based on a resuming request from the outside.

11 Claims, 22 Drawing Sheets

PROCESS CONTROL SYSTEM, PROCESS CONTROL APPARATUS AND PROGRAM UPDATE METHOD

CROSS-REFERENCE TO RELATED APPLICATIONS

This application is based upon and claims the benefit of priority from prior Japanese patent application No. 2018-180715, filed on Sep. 26, 2014, the entire contents of which are incorporated herein by reference.

TECHNICAL FIELD

The present disclosure relates to a process control system, a process control apparatus, and a program update method.

BACKGROUND ART

In the related art, a process control system configured to control a variety of state amounts (for example, pressure, temperature, flow rate or the like) of an industrial process is established in a plant, a factory or the like (hereinafter, simply referred to as 'plant' when they are collectively described), so that a high-level automated operation is implemented. Specifically, a controller, which is a core of the process control system, acquires detection results of a plurality of sensors (a flowmeter, a thermometer or the like), obtains an operation amount of an actuator (a valve or the like), in correspondence to the detection results, and operates the actuator, in correspondence to the operation amount, thereby controlling the diverse state amounts.

The process control system of the related art is established using a dedicated device having proprietary specification. A recent process control system is being gradually opened and is established using a universal device (a computer, a workstation or the like) having opened specification, in many cases. In the process control system in which the universal device is used, it is necessary to replace hardware and to update software, like a general information system. In the meantime, function enhancement of an operating system (OS), correction of bugs and vulnerability of the operating system, or the like may be exemplified as upgrade of the software.

JP-A-H11-3240 (hereinafter, referred to as PTL 1) discloses technology capable of changing a system program without influencing a control target, in a computer system for control having duplex process units (a control side and a standby side) mounted thereto. Specifically, the standby side is stopped to load a new system program, and is then activated, application data stored on the control side is copied to the standby side, the control side is stopped and the standby side is activated as the control side, so that the system program is changed without influencing the control target.

Also, JP-A-2015-5258 (hereinafter, referred to as PTL 2) discloses a process control apparatus capable of updating an operating system without stopping a process control system and guaranteeing a continuation operation of an application on the updated operating system.

In the process control system, as also disclosed in PTLs 1 and 2, it is necessary to update a program (referred to as 'update target program'), which may be an update target, while continuing to operate the process control system without stopping the same. At this time, it is needed to update the update target program simply and in a short time without executing complicated analysis and processing. The update target is a program to be updated.

The present disclosure has been made in view of the above situations, and an object thereof is to provide a process control system, a process control apparatus, and a program update method capable of updating an update target program simply and in a short time while continuing to operate a process control system without stopping the same.

SUMMARY OF INVENTION

A process control system (1) related to one aspect of the present invention includes: a first process control apparatus (10); and a second process control apparatus (20). The first process control apparatus includes: a first program execution unit (11) configured to execute a non-update target program (PA11) which is not an update target and an update target program (PB11 or the like) which may be the update target, and a first program update manager (15, 15A-15E) configured to pause the non-update target program based on a pause request from an outside, and to transfer a context (CA11) of the non-update target program to the second process control apparatus. The second process control apparatus comprises: a second program execution unit (21) configured to execute the non-update target program (PA21) which is not the update target and an update target program after update (PB21 or the like), and a second program update manager (25, 25A) configured to restore a context of the non-update target program by using the context transferred from the first program update manager, to initialize a context of the update target program, and to cause the second program execution unit to resume the non-update target program and the update target program, based on a resuming request from the outside.

In the process control system related to one aspect of the present invention, when it is determined that processing of the update target program requested by the non-update target program is in progress, the first program update manager is configured to set an execution position of the non-update target program to a position immediately before a request for the processing of the update target program, and to delete information indicating that the processing of the update target program is in progress.

In the process control system related to one aspect of the present invention, when it is determined that processing of the update target program called by the non-update target program is in progress, the first program update manager is configured to wait until the update target program completes the processing in progress.

In the process control system related to one aspect of the present invention, when it is determined that there is an update target program of which processing is in progress among update target programs called by the non-update target program, the first program update manager is configured to: make a setting to prevent a request of a pre-registered update target program among the update target programs from being transmitted to the other update target programs; wait for the processing of the update target program to stop; extract restoration data necessary to resume processing from a context of the pre-registered update target program after the processing of the update target program stops; and transfer the extracted restoration data to the second process control apparatus. The second program update manager is configured to restore the context of the pre-registered update target program after update by using the restoration data transferred from the first program update manager.

In the process control system related to one aspect of the present invention, when a response indicative of a result of the first predetermined processing and a request of second predetermined request are received in response to a request for first predetermined processing, the update target program is configured to perform communication with other apparatuses by using a request/response protocol for notifying of a response indicative of a result of the second predetermined processing.

In the process control system related to one aspect of the present invention, when the update target program is a communication driver for enabling communication with other apparatuses, the first program update manager is configured to block a reception port of the update target program such that a new request is not to be received from the other apparatuses.

A process control apparatus (50) related to one aspect of the present invention includes: a program execution unit (51,52) configured to execute a non-update target program (PA11, PA21) which is not an update target and an update target program (PB11, PB21 or the like) which may be the update target; a first program update manager (15) configured to pause the non-update target program based on a pause request from an outside, and to transfer a context (CA11) of the non-update target program; and a second program update manager (25) configured to restore a context of the non-update target program by using the context transferred from the first program update manager, to initialize a context of the update target program after update, and to cause the program execution unit to resume the non-update target program and the update target program after the update, based on a resuming request from the outside.

A program update method related to one aspect of the present invention is a method in a process control apparatus (10, 20, 50) in which a non-update target program (PA11, PA21) which is not an update target and an update target program (PB1, PB21 or the like) which may be the update target are to be executed. The program update method includes: a first step (S12, S13) of pausing the non-update target program based on a pause request from an outside, and transferring a context of the non-update target program, and a second step (S22-S27) of restoration a context of the non-update target program which is not an update target by using the context transferred in the first step, initializing a context of the update target program after update, and resuming the non-update target program and the update target program, based on a resuming request from the outside.

In the program update method related to one aspect of the present invention, the first and second steps are executed in the same process control apparatus.

In the program update method related to one aspect of the present invention, the first and second steps are executed in different process control apparatuses.

According to the present disclosure, it is possible to update the update target program simply and in a short time while continuing to operate the process control system without stopping the same.

DESCRIPTION OF EMBODIMENTS

Figure 1:
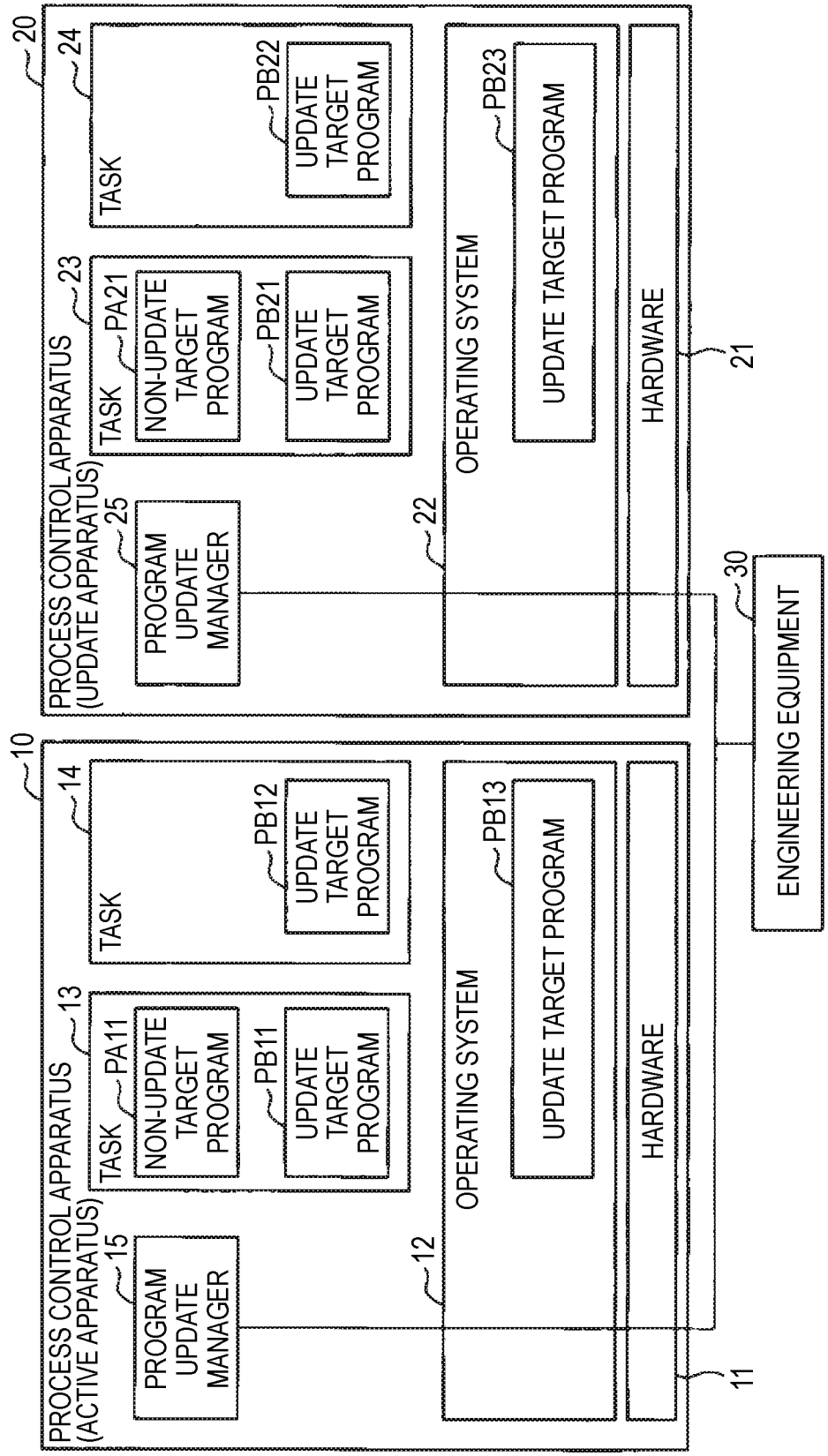
FIG. 1 is a functional configuration view depicting a schematic functional configuration of a process control system in accordance with a first exemplary embodiment of the present disclosure.

Hereinafter, the process control system, the process control apparatus, and the program update method in accordance with exemplary embodiments of the present disclosure will be described in detail with reference to the drawings. In the below, an outline of an exemplary embodiment of the present disclosure will be first described, and concepts, definitions of terms, or the like, which are used in the exemplary embodiment of the present disclosure, will be then described. Subsequently, a method that is used in the exemplary embodiment of the present disclosure will be described, and details of each exemplary embodiment will be then described.

[Outline]

An exemplary embodiment of the present disclosure is to update an update target program simply and in a short time while continuing to operate a process control system without stopping the same. Specifically, since the process control system is mostly required to continuously operate over a long time period in a unit of a month to a year so as to improve production efficiency even slightly, it is not possible to freely stop the process control system under operation. For example, it is not basically permitted to stop the process control system, except stop for periodic maintenance or shut down for safety of a plant, for example. The reason is that, if an unexpected break occurs during a process of continuing a chemical reaction, in a chemical process, for example, a half-finished product produced until then may not be usable, which causes in turn great loss.

Meanwhile, since the process control system is required to be free of erroneous operation or lack of operation from a viewpoint of safety, when a cause (bug or vulnerability of an operating system, for example) of an erroneous operation or the like is found, it is necessary to immediately take an action (update of the operating system) capable of solving the cause. However, as described above, since it is not possible to freely stop the process control system, it is not possible to immediately take an action even in the case in which the cause of the erroneous operation or the like is found.

Therefore, when the technology disclosed in PTL 1 is used, an application can be made to continuously operate by updating a system program on a standby side without badly influencing a control side and copying the application data on the control side up to now to the standby side, in a control apparatus of a redundant configuration. However, an extraction method of the application data to be copied and a method of resuming processing after the update depend on a design of the application and the methods remain confidential.

Also, when the technology disclosed in PTL 2 is used, it is possible to continue processing of any application while updating the operating system of the control apparatus. However, since the technology disclosed in PTL 2 is premised on the application restoration, the complicated analysis and processing may be required. Also, restoration processing of an internal state depending on functions of the operating system may be required.

In order to update a program (an update target program) such as the operating system required to be updated while continuing to operate the process control system without executing complicated analysis and processing, a solution that is simpler and is applicable more widely is needed. For example, a method in which the internal state of the operating system is not required to be completely restored or a method in which the restoration of the internal state of the operating system is never considered or is not required is needed.

In the exemplary embodiment of the present disclosure, when updating a variety of programs that are to be used in the process control system, a non-update target program, which is not an update target, is paused, based on a pause request from an outside, and a context of the non-update target program is transferred. Then, based on a resuming request from the outside, the context of the non-update target program, which is not an update target, is restored using the transferred context, a context of the update target program after the update is initialized, and the non-update target program and the update target program are resumed. Thereby, it is possible to update the update target program simply and in a short time while continuing to operate the process control system without stopping the same.

[Concepts, Definitions of Terms, or the Like]

The exemplary embodiment of the present disclosure can be implemented using a computer. On the computer, a plurality of tasks operates under management of an operating system (OS). The operating system is to manage a variety of resources (CPU time, a memory, an input/output device or the like) of the computer, and to appropriately al locate the resources to the tasks. In the meantime, "CPU" is an abbreviation of Central Processing Unit.

The task is a unit of processing to independently operate under control of the operating system. The plurality of tasks can operate concurrently. The operating system is configured to provide a function of communication between tasks. It is possible to exchange information (message) between the plurality of tasks to operate concurrently by the communication between tasks. In the meantime, it may be possible to exchange the information between tasks by using a shared memory or the like, in addition to the communication between tasks.

In the exemplary embodiment of the present disclosure, the diverse programs that are to be used in the process control system are classified into two types of a non-update target program and an update target program. In the exemplary embodiment of the present disclosure, the non-update target program is a program that does not change before and after update of the program. A main role of the non-update target program is to implement an application. Here, the application is typically control of a specific plant using PID control, sequence control or the like.

In the exemplary embodiment of the present disclosure, the update target program is a program that is to be called directly or indirectly from the non-update target program, except a case to be described later. A main role of the update target program is to smoothly use the resources of the computer system. The update target program is a so-called system program. The update target program is provided as the operating system, or a part of middleware. An exception of the update target program is a calling-side update target program. As described later, the calling-side update target program is, for example, a program having a function of calling (activating) the non-update target program, based on a trigger from the outside.

The tasks can be classified into a continuing task and a usage task. The continuing task is a task for executing the non-update target program. However, the update target program may be included in the continuing task. In the meantime, the usage task is a take for executing only the update target program. That is, the continuing task may call directly or indirectly the usage task. Here, the "calling" operation is not limited to function calling and procedure call calling. The communication between tasks, a system call, and an operation of using another program or a function of another program by other information communication are referred to as "calling".

The context is a situation on which a program depends when executing processing. The context is also referred to as situation, statement steps, state, data, storing or the like. A physical substance of the context is data that is to be stored in a storage means (a semiconductor memory, a magnetic disk device, an external medium, or the like). The software context includes all contents of a storage area of a memory or the like, which is used by the program.

When the software context can be restored, paused program can be unconditionally continued (universal principle of continuation). Also, when the software context is initialized for rebuild, the program can be unconditionally updated (universal principle of update). In the exemplary embodiment of the present disclosure, the update target program is updated simply and in a short time while continuing to operate the process control system without stopping the same, based on the two universal principles.

Context-dependent indicates that execution of processing of a program depends on the context. In the meantime, the context-dependent is also referred to as state-dependent, stateful or the like. Context-free indicates that execution of processing of a program does not depend on the context (in other words, there is no context). In the meantime, the context-free is also referred to as statement-steps free, no statement steps, state-free, no state, stateless, or the like.

An active apparatus is a device on a side currently operating. An update apparatus is a device on a side not currently operating and standing by for update of the program. The states of the active apparatus and the update apparatus may be switched each other. That is, a device operating as the active apparatus is switched to a standby state and becomes the update apparatus, and a device in a standby state as the update apparatus is switched to an operating state and becomes the active apparatus.

A model (example) of typical processing, which is executed when applying the exemplary embodiment of the present disclosure to control of an industrial process is described. The non-update target program for controlling a process is repeatedly called with any time period (for example, a period of 50 milliseconds to several seconds) from the calling-side update target program. The non-update target program executes following processing 1 to 4 whenever called.

1. The non-update target program executes current processing by using the context, which is a processing state until previous processing (in the meantime, an initial value is set for a first context).

2. The non-update target program acquires necessary information (for example, current positions of diverse sensors, which are states of the industrial process) and results of other control processing.

3. The non-update target program executes computation processing (for example, PID control, sequence control and control simulation), based on the acquired information.

4. The non-update target program outputs information (for example, operation of an actuator in a production equipment, ON/OFF of a switch) based on results of the computation processing or the like.

In this case, microscopically, the non-update target program controls the industrial process at discrete timings. However, since the industrial process continues to change even during a period in which the non-update target program does not execute the processing, the production equipment of the plant continues to operate. In the meantime, the range of the time period at which the non-update target program is called from the calling-side update target program is not limited to the above-exemplified range.

The pause of the non-update target program is to temporarily stop the non-update target program so that previous processing of the non-update target program can be resumed within a predetermined time after the previous processing is over. The context of the paused non-update target program is taken over when the non-update target program is resumed. Here, the "predetermined time" is a sufficiently short time determined by a design or the like.

The break of the non-update target program is to stop the update target program so that the previous processing of the non-update target program is not to be resumed within the predetermined time after the previous processing is over, or to prevent the context of the non-update target program from being taken over (for example, to initialize the state of the processing), irrespective of whether the previous processing is resumed within the predetermined time. Considering the purpose of the process control system, i.e., the control of the industrial process, the pause of the non-update target program is permitted but the break of the non-update target program is not permitted.

In the exemplary embodiment of the present disclosure, "request" and "response" include ones that are made in a device and are made between devices. For example, the "request" includes calling of a function, calling of a system call, a request for transmission of the communication between tasks, transmission of a request in network communication, or the like. The "response" includes return from the function calling, return from the system call calling, a reply of a processing result of the communication between tasks, a reply of a response in the network communication, or the like.

In the exemplary embodiment of the present disclosure, "in progress" indicates a state in which it is necessary to maintain the context under processing because a series of processing are not completed, in a device or between devices. The series of processing may be completed by performing exchange of the request and the response once or more than once. When the series of processing is completed, a non-progressing state is made and it is possible to initialize of the context. In the meantime, the network communication processing is performed between two devices, processing of one device is in progress after it transmits a request to the other apparatus until it receives a response (ACK, in a case of the universal communication protocol) from the other apparatus. When in progress, it is necessary to keep TCP connection or the like, for example.

[Methods to be Used]

In exemplary embodiments to be described later, for the non-update target program, the context (software context), which is used by the non-update target program, is all unconditionally copied during the pause, based on the universal principle of continuation. The takeover data necessary for continuation of the non-update target program is different for each program. However, it is possible to include takeover data, which is necessary for continuation of the non-update target program, in the context and to take over the same by the above "copy all" method.

In contrast, the update of the update target program includes partially correcting an existing function of the update target program and adding a new function to the existing function. In this case, there is no problem as to whether the function to be newly added is related to the existing function. That is, the function to be newly added may be a function that is totally different from the existing function. Therefore, when updating the update target program, a data structure of the context of the update target program may be significantly changed. In this case, based on the universal principle of update, a method of unconditionally initializing all the contexts, which are used by the update target program, upon the resuming. By the initialization, it is possible to unconditionally update the update target program.

In the exemplary embodiments to be described later, the update target program is updated using the above-described method, during the pause of the non-update target program. Thereby, in exemplary embodiments to be described later, it is possible to update the update target program simply and in a short time while continuing to operate the process control system without stopping the same.

First Exemplary Embodiment

<Functional Configuration of Process Control System>

FIG. 1 is a functional configuration view depicting a schematic functional configuration of a process control system in accordance with a first exemplary embodiment of the present disclosure. As shown in FIG. 1, the process control system 1 of the first exemplary embodiment includes a process control apparatus 10 (first process control apparatus), a process control apparatus 20 (second process control apparatus), and an engineering equipment 30. The process control apparatus 10 and the process control apparatus 20 are implemented using equivalent or similar computers. In the first exemplary embodiment, the process control apparatus 10 may be referred to as "active apparatus", and the process control apparatus 20 may be referred to as "update apparatus".

In the first exemplary embodiment, for update of the program, the function operating in the process control apparatus 10 is switched to the process control apparatus 20. That is, at first, the process control apparatus 10, which is the active apparatus, operates so as to control the process, and the process control apparatus 20, which is the update apparatus, stands by. Thereafter, based on an instruction signal from the engineering equipment 30, a process control function of the process control apparatus 10 (active apparatus) is paused, and the function is resumed in the process control apparatus 20 (update apparatus). The process control apparatus 10 and the process control apparatus 20 have a function of updating a program in a state in which the system is operating.

The process control apparatus 10 has functions of the hardware 11 (first program execution unit), an operating system 12, a task 13, a task 14, and a program update manager 15 (first program update manager). The hardware 11 includes a CPU, a memory, an input/output device, a communication device, or the like, and is configured to execute a variety of programs (including the non-update target program and the update target program), which are to be used in the process control apparatus 10. In the meantime, a function of the process control apparatus 10 is implemented as a program for implementing the function is executed by the hardware 11. That is, the function of the process control apparatus 10 is implemented as the software and the hardware resource cooperate each other.

The operating system 12 is located between the hardware 11 and the application (tasks 13 and 14 or the like), and is configured to provide the application with a prescribed interface while managing the hardware 11. Specifically, the operating system 12 has a function of managing the hardware resources (CPU time, a memory, an input/output, or the like) of the process control apparatus 10 and appropriately allocating the same to each task. The operating system 12 includes an update target program PB13.

The task 13 is a task having a function of controlling a target process. The task 13 is also referred to as "control task". The task 13 includes a non-update target program PA11 and an update target program PB11. The non-update target program PA11 is a main program for controlling a process. The task 14 is a task for providing a predetermined service on the basis of a direct or indirect request from the task 13. The task 14 is also referred to as "usage task". The task 14 includes an update target program PB12.

The program update manager 15 is configured to control processing of performing switching (also referred to as "online update") from the active apparatus to the update apparatus while operating the system. Specifically, when a pause request is transmitted from the engineering equipment 30, the program update manager 15 executes processing necessary to pause the non-update target program PA11 and to resume a function thereof in the process control apparatus 20 (update apparatus). The processing that is to be executed by the program update manager 15 will be described later in detail. In the meantime, the program update manager 15 may also execute processing necessary to pause the update target program and to resume a function thereof.

The process control apparatus 20 has a similar configuration to the process control apparatus 10, and includes functions of a hardware 21 (second program execution unit), an operating system 22, a task 23, a task 24, and a program update manager 25 (second program update manager). The hardware 21 is similar to the hardware 11, and is configured to execute a variety of programs (including the non-update target program and the update target program), which are to be used in the process control apparatus 20. In the meantime, the function of the process control apparatus 20 is also implemented as the software and the hardware resource cooperate each other.

The operating system 22 has a similar function to the operating system 12. Also, the operating system 22 includes an update target program PB23. The task 23 has a similar function to the task 13. Also, the task 23 includes a non-update target program PA21 and an update target program PB21. The task 24 has a similar function to the task 14. Also, the task 24 includes an update target program PB22. The program update manager 25 has a similar function to the program update manager 15. In the meantime, the program update manager 25 is configured to operate in cooperation with the program update manager 15.

In the meantime, the designation of "active apparatus" and "update apparatus" depends on a situation at the designation time, and the roles of the process control apparatus 10 and the process control apparatus 20 may change, depending on the situation. That is, the process control apparatus 20 may function as the active apparatus, and the process control apparatus 10 may function as the update apparatus. Also, the update of the program and the shift of the process control apparatus to operate may be performed using three or more process control apparatuses.

The engineering equipment 30 is configured to perform a variety of engineering in the process control system 1 by using design information of the plant including design information of the process control system 1. Also, the engineering equipment 30 is configured to issue a command of pausing the process control function of the process control apparatus 10 (active apparatus) and resuming the function in the process control apparatus 20 (update apparatus). In the meantime, the engineering equipment 30 is implemented by a personal computer or a computer such as a workstation, for example.

Figure 2:
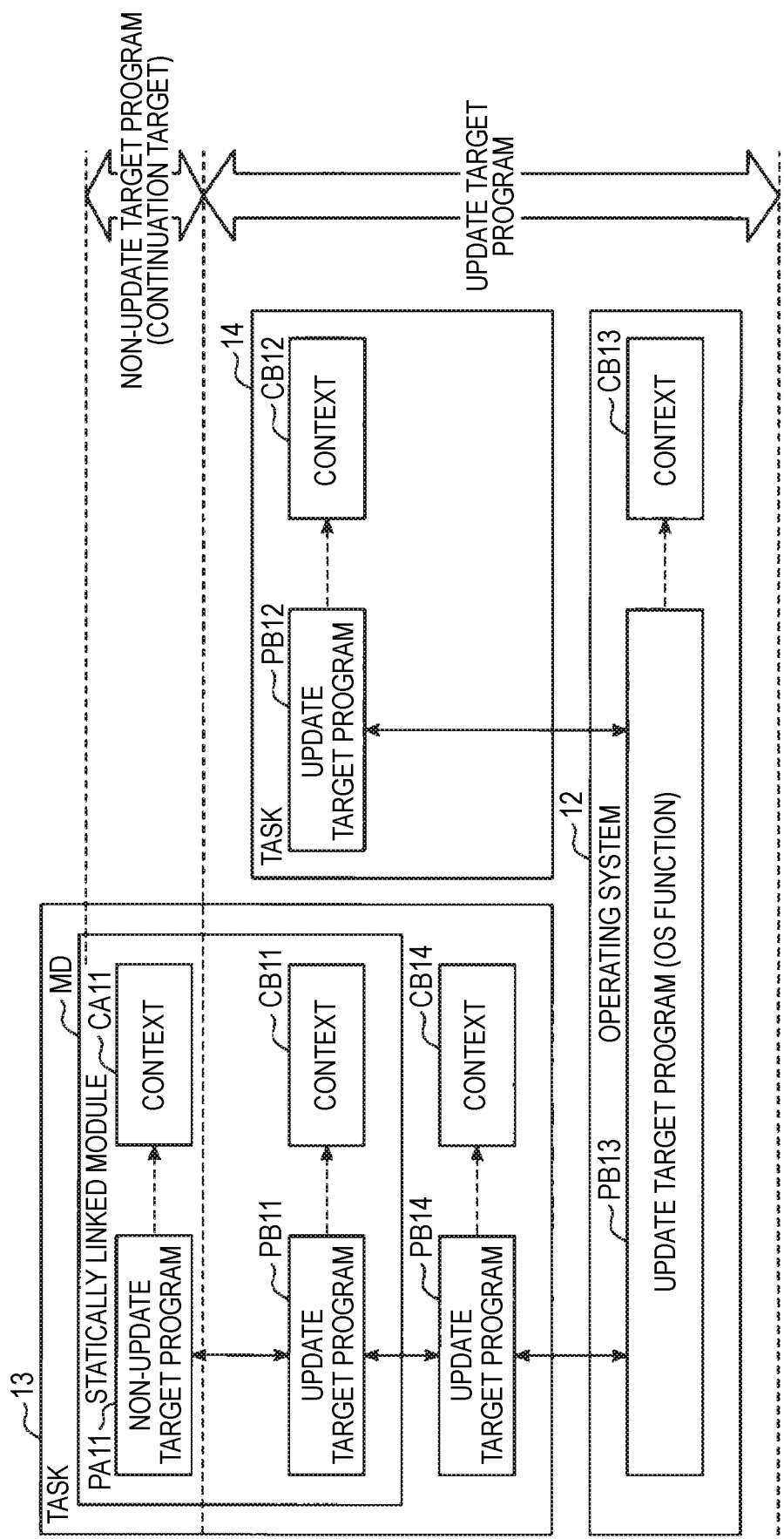
FIG. 2 is a schematic configuration view depicting detailed configurations of programs that are to operate in a process control apparatus, in the first exemplary embodiment of the present disclosure.

FIG. 2 is a schematic configuration view depicting detailed configurations of programs that are to operate in a process control apparatus, in the first exemplary embodiment of the present disclosure. FIG. 2 depicts an internal configuration of the process control apparatus 10 but an internal configuration of the process control apparatus 20 is also similar. As shown in FIG. 2, each program has a context. The context is a state in a situation in which the program is operating. Specifically, the context is data that is stored in a semiconductor memory, a magnetic disk device or the like. The data may be data in a memory space of the CPU or may be data that is managed by a database management system (DBMS), for example.

In the first exemplary embodiment, a state indicated by the data may be referred to as "context", and may be referred to as "context", including a storage means for physically storing the data. In the meantime, the context may include information about an execution position of each program (a specific position in a program code).

In the example of FIG. 2, the task 13 includes the non-update target program PA11, the update target program PB11, and an update target program PB14. The update target program PB11 is a dedicated internal function for the non-update target program PA11, and is statically linked with the non-update target program PA11 to form a module MD. In the module MD, the non-update target program PA11 can call the update target program PB11.

Also, the update target program PB14 is a universal function common to the module MD and other modules, and is dynamically linked with the module MD or the like. The module MD and the update target program PB14 can call each other through a predefined API (Application Programming Interface). The update target program PB14 is, for example, a library program for easily using an OS function.

The operating system 12 includes the update target program PB13. The update target program PB13 is a program for implementing an OS function. The update target program PB13 may be called from the task 13 and the task 14. The task 14 includes the update target program PB12.

In FIG. 2, a relationship between the program and the context is described. The non-update target program PA11 included in the task 13 accesses a context CA11, the update target program PB11 accesses a context CB11, and the update target program PB14 accesses a context CB14. The update target program PB12 included in the task 14 accesses a context CB12. The update target program PB13 included in the operating system 12 accesses a context CB13. In the meantime, the access from the program to the context may be made only for reference or may be accompanied with writing.

The non-update target program PA11 of the programs shown in FIG. 2 is a continuation target program. That is, the non-update target program PA11 is not an update target. Also, the update target programs PB11, PB12, PB13 and PB14 are programs that may be an update target. When updating the update target program, the non-update target program continues to operate while switching an operating environment from the active apparatus to the update apparatus.

An important aspect with respect to the update of the program while operating the system is that no context is shared between the non-update target program and the update target program. That is, the non-update target program PA11 does not directly access the contexts CB11, CB12, CB13 and CB14, which are contexts of the update target programs. Also, the update target programs PB11, PB12, PB13 and PB14 do not directly access the context CA11, which is a context of the non-update target program PA11.

Figure 3:
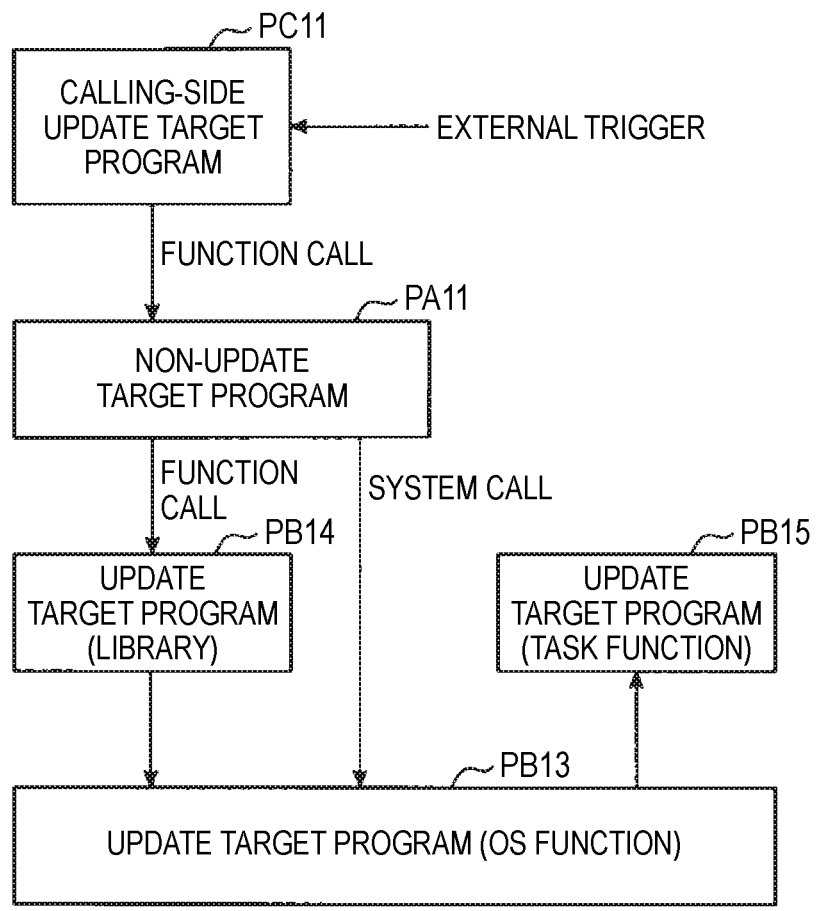
FIG. 3 is a schematic view depicting a typical calling relationship between a non-update target program and an update target program, in the first exemplary embodiment of the present disclosure.

FIG. 3 is a schematic view depicting a typical calling relationship between a non-update target program and an update target program, in the first exemplary embodiment of the present disclosure. As shown in FIG. 3, a calling-side update target program PC11 is a program on a side calling the non-update target program PA11. An update target program except the calling-side update target program PC11 is called directly or indirectly from the non-update target program PA11.

Specifically, the calling-side update target program PC11 receives an external trigger to call the non-update target program PA11. Here, the external trigger is, for example, a time-out signal of a fixed-period timer, a receiving interruption signal from a network, or the like. The external trigger is repeatedly transmitted to the calling-side update target program PC11. Thereby, the calling-side update target program PC11 repeatedly activates the non-update target program PA11.

The non-update target program PA11 does not directly or indirectly call the update target programs PB13, PB14 and PB15 during execution of the non-update target program. During the execution of the non-update target program PA11, a trigger waiting is not made. The non-update target program PA11 returns control to the calling-side update target program PC11 when the processing is over without stopping the processing (trigger waiting).

Also, the non-update target program PA11 may be paused for online program update. The timing to pause the non-update target program PA11 is either immediately before calling the non-update target program PA11 from the calling-side update target program PC11 or immediately after returning to the calling-side update target program PC11 from the non-update target program PA11. Thereby, during the program update, the processing returns to the calling-side of the non-update target program PA11, and stack areas used by the non-update target program PA11 are all released. Therefore, no stack area is included in the context CA11 of the paused non-update target program PA11.

Figure 4:
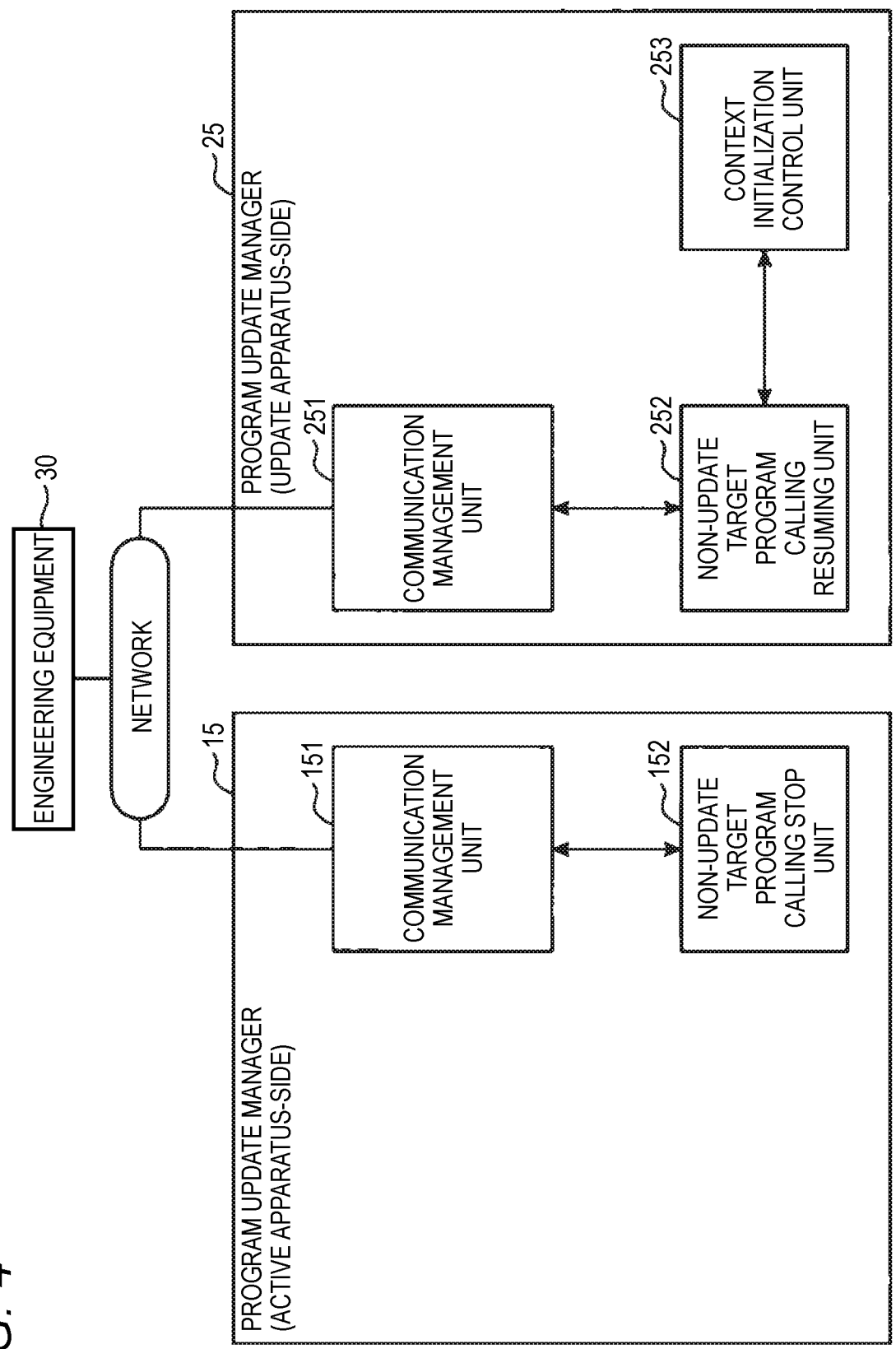
FIG. 4 is a functional block diagram depicting detailed functional configurations of program update managers (an active apparatus side and an update apparatus side), in the first exemplary embodiment of the present disclosure.

FIG. 4 is a functional block diagram depicting detailed functional configurations of program update managers (an active apparatus side and an update apparatus side), in the first exemplary embodiment of the present disclosure. In FIG. 4, the program update manager 15 is a function of the active apparatus (process control apparatus 10 in FIG. 1). Also, the program update manager 25 is a function of the update apparatus (process control apparatus 20 in FIG. 1). The program update manager 15 and the program update manager 25 are configured to operate in cooperation with each other. The process control apparatus has both the function of the program update manager 15 and the function of the program update manager 25, and is configured to switch the functions, depending on whether it operates as the active apparatus or the update apparatus.

As shown in FIG. 4, the program update manager 15 includes a communication management unit 151 and a non-update target program calling stop unit 152. Also, the program update manager 25 includes a communication management unit 251, a non-update target program calling resuming unit 252, and a context initialization control unit 253. In the meantime, the process control apparatus 10 and the process control apparatus 20 are respectively connected to the engineering equipment 30 via a network. The communication management unit 151 of the process control apparatus 10 and the communication management unit 251 of the process control apparatus 20 are respectively configured to perform communication with the engineering equipment 30 via the network.

The communication management unit 151 issues an instruction to pause the non-update target program PA11 to the non-update target program calling stop unit 152 when it receives a request (pause request) transmitted from the engineering equipment 30. Also, when the processing (pause processing) requested from the engineering equipment 30 is completed, the communication management unit 151 transfers the context CA11 (refer to FIG. 2) of the non-update target program PA11 to the update apparatus, and notifies the engineering equipment 30 that the pause processing is completed.

The non-update target program calling stop unit 152 is configured to pause the non-update target program PA11, in accordance with the instruction issued from the communication management unit 151. Specifically, the non-update target program calling stop unit 152 pauses the calling of the non-update target program PA11. More specifically, the non-update target program calling stop unit 152 pauses the non-update target program PA11 by stopping the calling-side update target program PC11 (refer to FIG. 3) from calling the non-update target program PA11. When the pause of the non-update target program PA11 is completed, the non-update target program calling stop unit 152 notifies the communication management unit 151 that the pause processing is completed.

In the meantime, when the non-update target program PA11 is paused, the program update manager 15 executes processing of storing the context CA11 (refer to FIG. 2) of the non-update target program PA11 in the storage means (not shown). The communication management unit 151 reads out the context CA11 stored in the storage means and transfers the same to the update apparatus. The processing of storing the context CA11 in the storage means may also be executed by the non-update target program calling stop unit 152.

The communication management unit 251 issues an instruction to resume the non-update target program to the non-update target program calling resuming unit 252 when it receives a request (resuming request) transmitted from the engineering equipment 30. The communication management unit 251 stores (copies) the context (context CA11 of the non-update target program PA11) transferred from the communication management unit 151 in the same area (address) as the active apparatus. Thereby, a state equivalent to the pause of the non-update target program PA11 is reproduced in the process control apparatus 20. Also, when the processing (resuming processing) requested from the engineering equipment 30 is completed, the communication management unit 251 notifies the engineering equipment 30 that the resuming processing is completed.

The non-update target program calling resuming unit 252 is configured to resume the non-update target program PA11, in accordance with the instruction issued from the communication management unit 251. Specifically, the non-update target program calling resuming unit 252 executes an activation program of the process control apparatus 20, and enables the calling-side update target program PC11 (which is similar to the calling-side update target program PC11 shown in FIG. 3) to call the non-update target program PA21 (refer to FIG. 1). In the meantime, since the non-update target program PA21 is the same program as the non-update target program PA11, the calling of the non-update target program PA21 is synonymous with the calling resuming of the non-update target program PA11.

The non-update target program calling resuming unit 252 enables the context initialization control unit 253 to implement processing when the processing is not executed yet in the context initialization control unit 253 after an instruction is issued from the communication management unit 251. The non-update target program calling resuming unit 252 is configured to resume the calling-side update target program PC11 so that the calling-side update target program PC11 (which is similar to the calling-side update target program PC11 shown in FIG. 3) is to call the non-update target program PA21. When the resuming of the non-update target program PA11 (non-update target program PA21) is completed, the non-update target program calling resuming unit 252 notifies the communication management unit 251 that the resuming processing is completed.

The context initialization control unit 253 is configured to issue an instruction as to whether to initialize the context to the operating system 22, based on the instruction issued from the non-update target program calling resuming unit 252. Specifically, the context initialization control unit 253 bypasses the initialization processing for the context CA11 of the non-update target program and issues an instruction to permit the initialization for the context of the update target program. In the meantime, when the initialization processing of the context is completed, the context initialization control unit 253 notifies the non-update target program calling resuming unit 252 that the initialization processing has been completed.

<Program Update Method>

Figure 5:
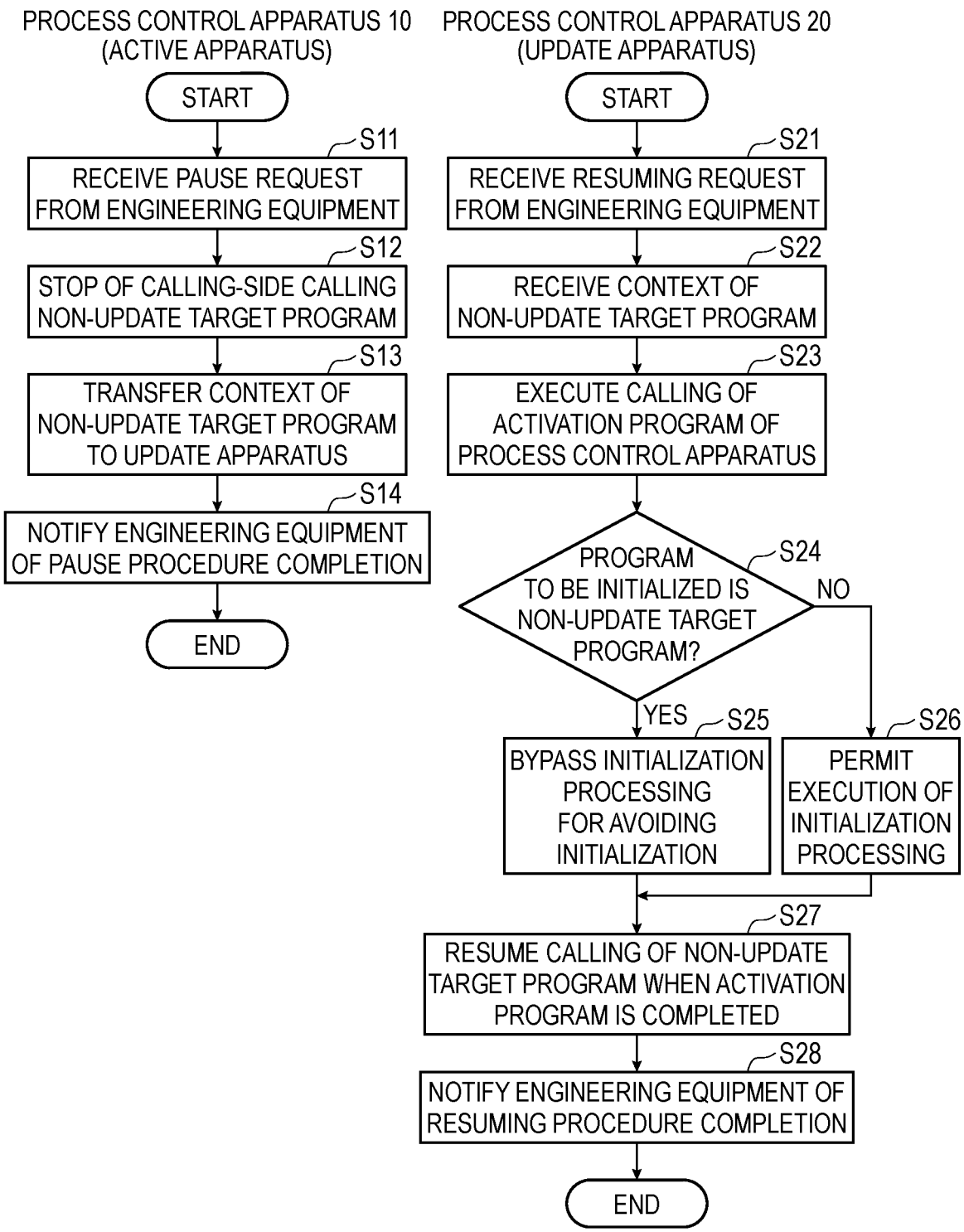
FIG. 5 is a flowchart depicting a program update method in accordance with the first exemplary embodiment of the present disclosure.

FIG. 5 is a flowchart depicting a program update method in accordance with the first exemplary embodiment of the present disclosure. As a premise that processing of the flowchart shown in FIG. 5 is executed, the process control apparatus 10 (active apparatus) operates by using the update target program before update. Also, the process control apparatus 20 (update apparatus) stands by in a state in which the update target program after update is installed. The non-update target program is not updated, and the same programs (non-update target programs PA11 and PA21) are executed in the process control apparatus 10 and the process control apparatus 20.

Also, a request (pause request) is transmitted at an appropriate timing from the engineering equipment 30 to the process control apparatus 10 (active apparatus), and a request (resuming request) is transmitted at an appropriate timing from the engineering equipment 30 to the process control apparatus 20 (update apparatus). That is, the engineering equipment 30 first transmits a message, which requests the pause, to the process control apparatus 10. Then, the engineering equipment 30 receives a message, which indicates completion of the pause, from the process control apparatus 10. Then, the engineering equipment 30 transmits a message, which requests the resuming, to the process control apparatus 20. Then, the engineering equipment 30 receives a message, which indicates completion of the resuming, from the process control apparatus 20.

In the meantime, after transmitting the message, which requests the pause, to the process control apparatus 10, the engineering equipment 30 may enable the process control apparatus 10 to issue the resuming request to the process control apparatus 20. When the process control apparatus 10 is enabled to issue the resuming request, the engineering equipment 30 does not transmit the message, which requests the resuming, to the process control apparatus 20. Instead, the process control apparatus 10 may also notify the process control apparatus 20 of the message which indicates completion of the pause, thereby requesting the resuming to the process control apparatus 20.

As shown in FIG. 5, the message (message requesting the pause) transmitted from the engineering equipment 30 is received by the process control apparatus 10 (active apparatus) (step S11). Specifically, the message is received by the communication management unit 151 of the program update manager 15 provided in the process control apparatus 10 (active apparatus). When the message transmitted from the engineering equipment 30 is received, an instruction to pause the non-update target program PA11 is output from the communication management unit 151 to the non-update target program calling stop unit 152.

Accordingly, processing of stopping the calling side (calling-side update target program PC11) calling the non-update target program PA11 is executed in the non-update target program calling stop unit 152 (step S 12). Specifically, in the non-update target program calling stop unit 152, the processing of pausing the non-update target program PA11 by stopping the calling-side update target program PC11 (refer to FIG. 3) from calling the non-update target program PA11 is executed. Here, when the non-update target program PA11 is paused, processing of storing the context CA11 of the non-update target program PA11 in the storage means (not shown) is executed in the program update manager 15.

When the pause of the non-update target program PA11 is completed, the non-update target program calling stop unit 152 notifies the communication management unit 151 of the completion of the pause. Then, processing of reading out the context CA11 of the non-update target program PA11 from the storage means (not shown) and transferring the same to the update apparatus is executed in the communication management unit 151 (step S13). When the above processing is completed, processing of notifying the engineering equipment 30 that the pause processing is completed is executed in the communication management unit 151 (step S14).

As shown in FIG. 5, the message (message requesting the resuming) transmitted from the engineering equipment 30 is received by the process control apparatus 20 (update apparatus) (step S21). Specifically, the message is received by the communication management unit 251 of the program update manager 25 provided in the process control apparatus 20 (active apparatus). When the message transmitted from the engineering equipment 30 is received, an instruction to resume the non-update target program PA11 is output from the communication management unit 251 to the non-update target program calling stop unit 252.

Also, processing of receiving the context (context CA11 of the non-update target program PA11) transferred from the process control apparatus 10 (active apparatus) is executed in the communication management unit 251 (step S22). Then, processing of storing (copying) the received context in the same area (address) as the active apparatus is executed in the communication management unit 251. Thereby, a state equivalent to the pause of the non-update target program PA11 is reproduced in the process control apparatus 20.

When the instruction to resume the non-update target program PA11 is input, processing of calling the activation program of the process control apparatus 20 (update apparatus) is executed in the non-update target program calling resuming unit 252 (step S23). When the activation program is called, processing of initializing the context is first executed in the context initialization control unit 253. Specifically, the context initialization control unit 253 determines whether the program to be initialized is a non-update target program (step S24).

When it is determined that the program to be initialized is a non-update target program (step S24: YES), processing of bypassing the initialization processing is executed in the context initialization control unit 253 (step S25). Thereby, the initialization of the context (context CA11 of the non-update target program PA11) stored (copied) in the same area (address) as the active apparatus is avoided. On the other hand, when it is determined that the program to be initialized is not a non-update target program (step S24: NO), processing of permitting execution of the initialization processing is executed in the context initialization control unit 253 (step S26). Thereby, processing of initializing the contexts of all the update target programs is executed.

When the initialization processing is completed, the context initialization control unit 253 notifies the non-update target program calling resuming unit 252 of the completion of the initialization processing. When the context initialization control unit 253 notifies of the completion of the initialization processing and the activation program is completed, processing of resuming the calling of the non-update target program PA11 (non-update target program PA21) is executed in the non-update target program calling resuming unit 252 (step S27).

When the resuming of the non-update target program PA11 (non-update target program PA21) is completed, the non-update target program calling resuming unit 252 notifies the communication management unit 251 of the completion of the resuming processing. When the notification is given, processing of notifying the engineering equipment 30 of the completion of the resuming processing is executed by the communication management unit 251 (step S28). In this way, the online update is performed.

As described above, in the first exemplary embodiment, the non-update target program PA11 which is not an update target, is first paused in the process control apparatus 10 (active apparatus), based on the pause request transmitted from the engineering equipment 30, and the context CA11 of the non-update target program PA11 is transferred to the process control apparatus 20 (update apparatus). Then, based on the resuming request transmitted from the engineering equipment 30, the context CA11 of the non-update target program PA21, which is not an update target, is restored using the transmitted context CA11 in the process control apparatus 20 (update apparatus), the context of the update target program after update is initialized, and the non-update target program and the update target program are resumed. Thereby, it is possible to update the update target program simply and in a short time while continuing to operate the process control system without stopping the same.

Second Exemplary Embodiment

<Configuration of Process Control System>

Figure 6:
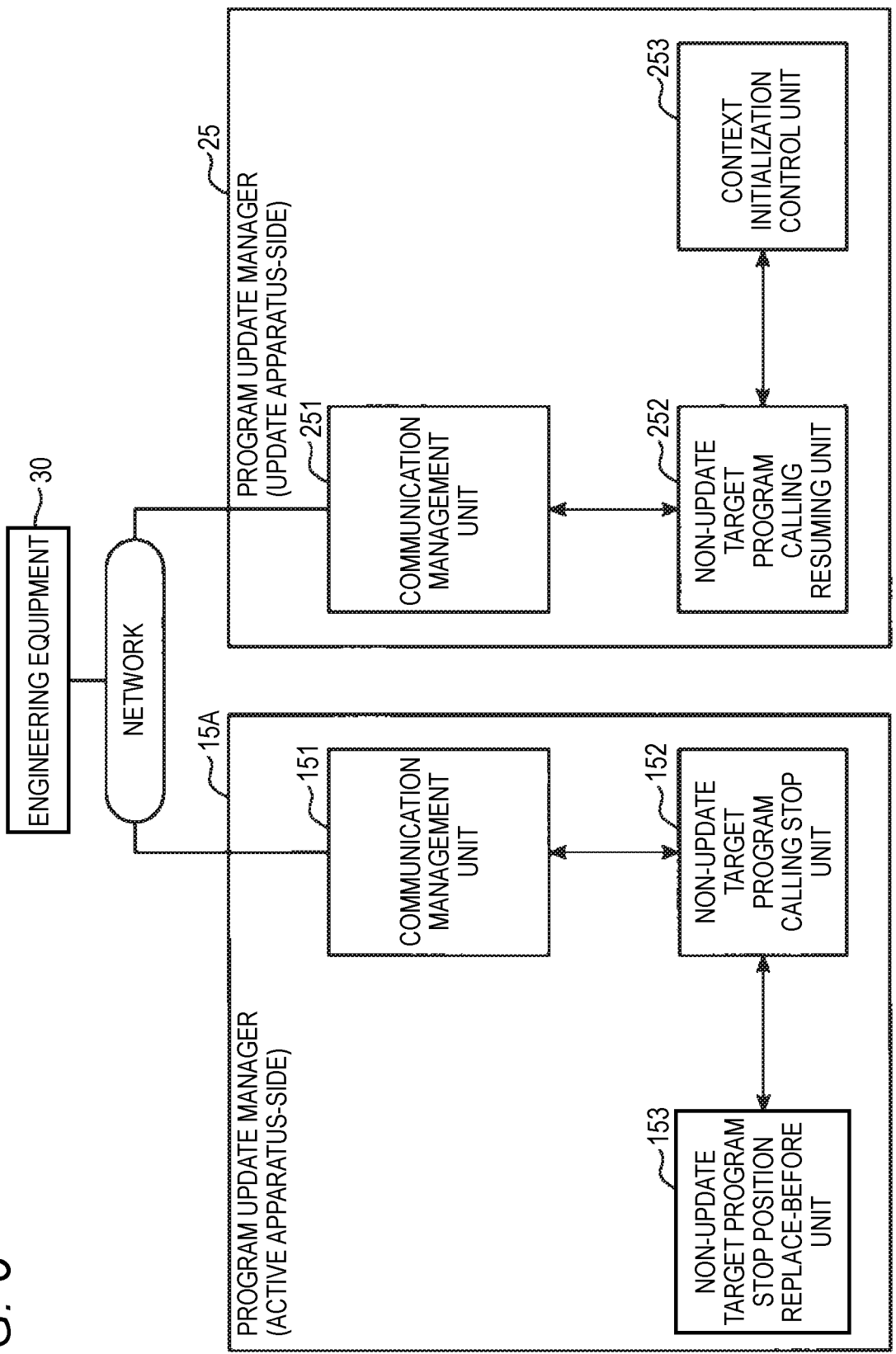
FIG. 6 is a functional block diagram depicting detailed functional configurations of program update managers (an active apparatus side and an update apparatus side), in a second exemplary embodiment of the present disclosure.

FIG. 6 is a functional block diagram depicting detailed functional configurations of program update managers (an active apparatus side and an update apparatus side), in a second exemplary embodiment of the present disclosure. Also, in FIG. 6, the configurations corresponding to the configurations shown in FIG. 4 are denoted with the same reference numerals. Also, the functional configuration of the entire process control system of the second exemplary embodiment is similar to that described with reference to FIGS. 1 to 3. In the below, differences from the first exemplary embodiment are mainly described.

In the second exemplary embodiment, when there is processing in progress on the update target program (for example, the update target program PB11 shown in FIGS. 1 and 2) called from the non-update target program PA11, the processing is rapidly broken off. At this time, an execution position of the non-update target program PA11 is set to a position immediately before request the update target program to process, so that the context of the non-update target program PA11 is corrected. Also, information, which indicates that the update target program is in progress, is deleted to guarantee the continuation operation of the process control system 1.

As shown in FIG. 6, in the second exemplary embodiment, a program update manager 15A of the active apparatus has such a configuration that a non-update target program stop position replace-before unit 153 is added to the program update manager 15 of the active apparatus shown in FIG. 4. Also, the program update manager 25 of the update apparatus has the same configuration as that shown in FIG. 4.

When the non-update target program calling stop unit 152 pauses the calling-side update target program PC11 (refer to FIG. 3), the non-update target program stop position replace-before unit 153 determines whether the processing of the update target program requested by the non-update target program PA11 is in progress. When it is determined that the processing of the update target program requested by the non-update target program PA11 is in progress, the non-update target program stop position replace-before unit 153 sets the execution position of the non-update target program PA11 to a position immediately before requesting the update target program to process. At this time, the non-update target program stop position replace-before unit 153 deletes information, which indicates that the update target program of the non-update target program PA11 is in progress.

<Program Update Method>

Figure 7:
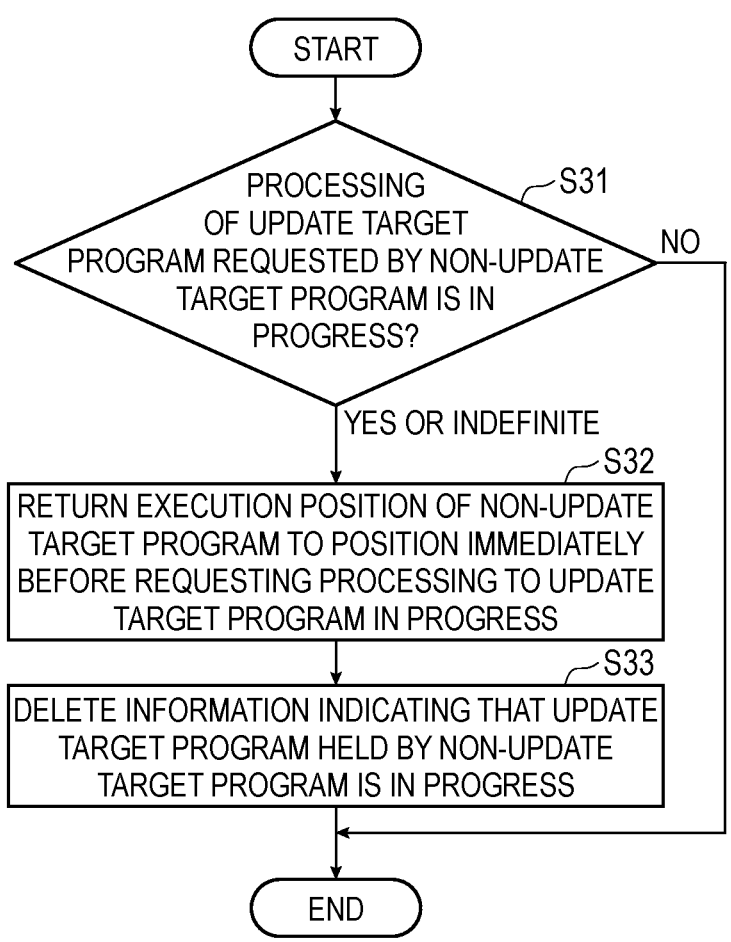
FIG. 7 is a flowchart depicting a program update method in accordance with the second exemplary embodiment of the present disclosure.

FIG. 7 is a flowchart depicting a program update method in accordance with the second exemplary embodiment of the present disclosure. The flowchart shown in FIG. 7 depicts processing that is to be executed in the non-update target program stop position replace-before unit 153 provided in the program update manager 15A. The processing of the flowchart shown in FIG. 7 is executed between the processing of step S12 and step S13 in FIG. 5.

When the processing of step S12 shown in FIG. 5 is executed, the non-update target program PA11 is paused. Specifically, the non-update target program PA11 is paused immediately before calling the non-update target program PA11 from the calling-side update target program PC11 or immediately after returning to the calling-side update target program PC11 from the non-update target program PA11. When the non-update target program PA11 is paused, the non-update target program calling stop unit 152 notifies the non-update target program stop position replace-before unit 153 of the pause.

Then, the non-update target program stop position replace-before unit 153 determines whether processing of the update target program requested by the non-update target program PA11 is in progress (step S31). When it is determined that the processing requested by the non-update target program PA11 is in progress (step S31: YES), or when it is determined that it is indefinite (it is not possible to determine whether the processing is in progress), following processing is executed in the non-update target program stop position replace-before unit 153. That is, processing of setting the execution position of the non-update target program to a position immediately before requesting processing to the update target program in progress is executed (step S32).

When the above processing is over, processing of deleting the information, which is held by the non-update target program PA11 and indicates that the update target program is in progress, is executed in the non-update target program stop position replace-before unit 153 (step S32). The processing is executed, so that the information held by the non-update target program PA11 becomes information immediately before requesting the update target program in progress to process. Also, when the processing of step S33 is executed, the processing of the flowchart shown in FIG. 7 is over.

Also, when it is determined in step S31 that the processing requested by the non-update target program PA11 is not in progress (step S31: NO), the processing of the flowchart shown in FIG. 7 is over without executing the processing of steps S32 and S33. When the processing of the flowchart shown in FIG. 7 is over, the non-update target program stop position replace-before unit 153 notifies the non-update target program calling stop unit 152 of the fact.

Then, the processing (step S13 in FIG. 5) of transferring the context CA11 of the non-update target program PA11 to the process control apparatus 20 and the processing (step S14 in FIG. 5) of notifying the engineering equipment 30 of the pause completion are sequentially executed in the communication management unit 151. Also, in the process control apparatus 20, the processing of resuming the non-update target program PA11 (non-update target program PA21) is executed in the similar manner to the first exemplary embodiment.

As described above, in the second exemplary embodiment, when the non-update target program PA11, which is not an update target, is paused in the process control apparatus 10 (active apparatus), based on the pause request of the engineering equipment 30, following processing is executed. First, the non-update target program stop position replace-before unit 153 determines whether the update target program is in progress. When the non-update target program stop position replace-before unit 153 determines that the update target program is in progress, processing of setting the execution position of the non-update target program PA11 to a position immediately before a request for processing of update target program is executed. At this time, the non-update target program stop position replace-before unit 153 deletes the information, which is held by the non-update target program PA11 and indicates that the update target program of is in progress.

By the above processing, the processing requested to the update target program by the non-update target program PA11 is not executed, and the information, which is held by the non-update target program PA11 and indicates the execution position of the non-update target program PA11 and the state of the update target program, is set to a position immediately before a request for the processing of the update target program. Thereby, it is possible to update the update target program in a short time while guaranteeing the continuation operation of the process control system 1.

Third Exemplary Embodiment

<Functional Configuration of Process Control System>

Figure 8:
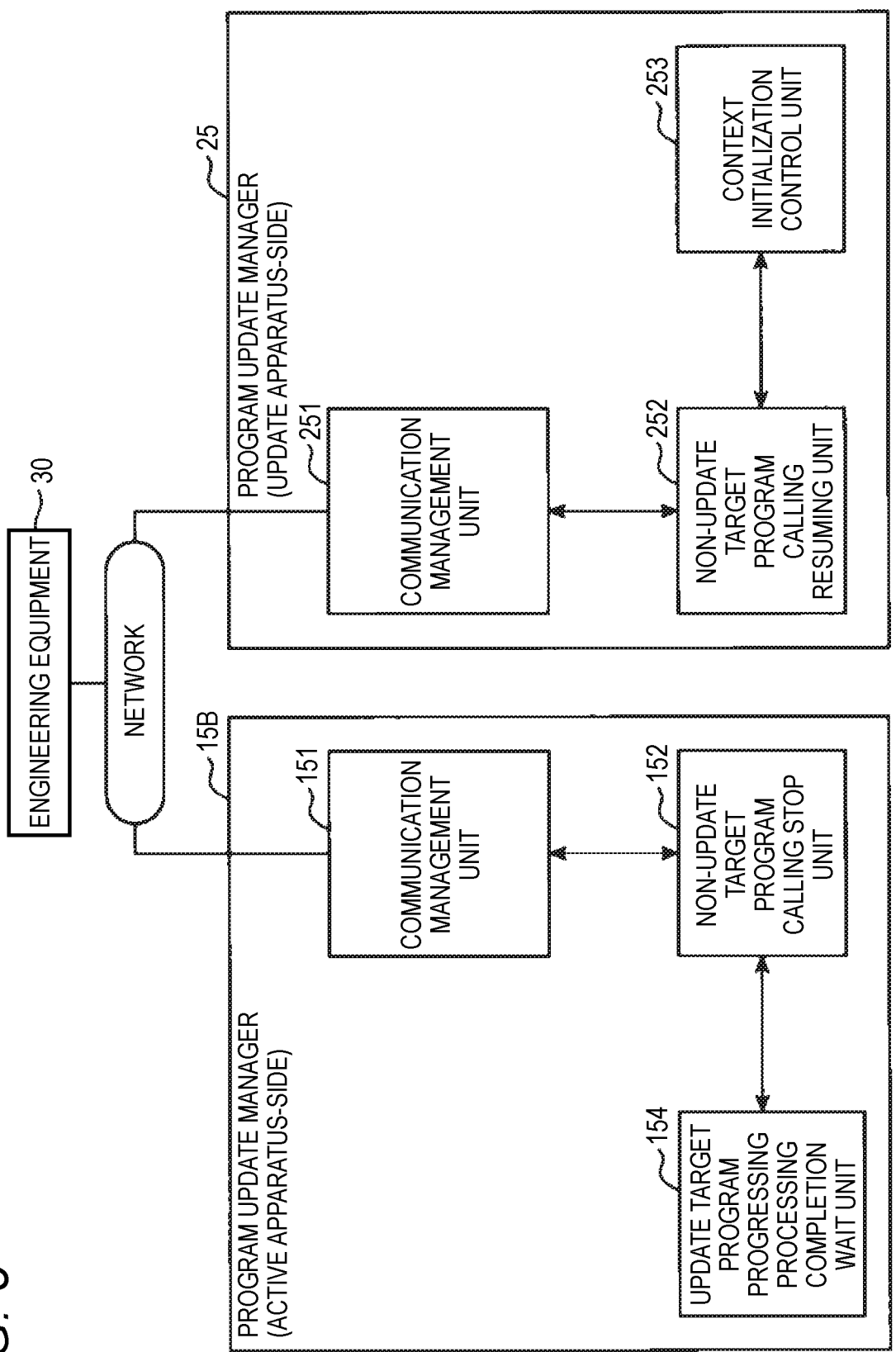
FIG. 8 is a functional block diagram depicting detailed functional configurations of program update managers (an active apparatus side and an update apparatus side), in a third exemplary embodiment of the present disclosure.

FIG. 8 is a functional block diagram depicting detailed functional configurations of program update managers (an active apparatus side and an update apparatus side), in a third exemplary embodiment of the present disclosure. In FIG. 8, the configurations corresponding to the configurations shown in FIG. 4 are denoted with the same reference numerals. Also, the functional configuration of the entire process control system of the third exemplary embodiment are similar to that described with reference to FIGS. 1 to 3. In the below, differences from the first exemplary embodiment are mainly described.

The third exemplary embodiment is designed to wait for processing to be entirely completed when there is processing in progress on the update target program called from the non-update target program PA11. In the third exemplary embodiment, the context CA11 of the non-update target program PA11 is transferred to the update apparatus in a state in which the processing of the update target program called from the non-update target program PA11 is entirely completed. Thereby, the continuation operation of the process control system 1 is guaranteed.

For example, in a state in which the non-update target program PA11 included in the task 13 shown in FIGS. 1 and 2 transmits a request to the update target program PB12 included in the task 14 via the communication between tasks provided by the operating system 12 and waits for a response, a situation in which the calling of the non-update target program PA11 is paused is considered. In the third exemplary embodiment, in this situation, it waits for all the update target programs, including the update target program PB12, to complete the processing in progress.

As shown in FIG. 8, in the third exemplary embodiment, a program update manager 15B of the active apparatus has such a configuration that an update target program progressing processing completion wait unit 154 is added to the program update manager 15 of the active apparatus shown in FIG. 4. In the meantime, the program update manager 25 of the update apparatus has the same configuration as that shown in FIG. 4.

When the non-update target program calling stop unit 152 executes the processing of pausing the non-update target program PA11, the update target program progressing processing completion wait unit 154 determines whether the update target program called from the non-update target program PA11 is in progress. When it is determined that the update target program called from the non-update target program PA11 is in progress, the update target program progressing processing completion wait unit 154 waits that all the update target programs called from the non-update target program PA11 complete the processing in progress. In the meantime, whether the processing in progress is completed may be perceived by making a request to the operating system 12 from the update target program progressing processing completion wait unit 154.

<Program Update Method>

Figure 9:
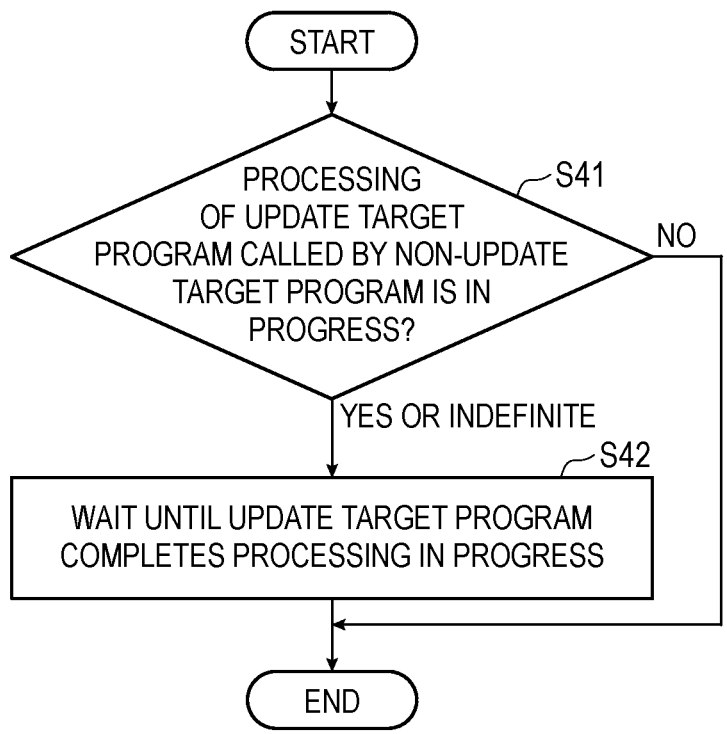
FIG. 9 is a flowchart depicting a program update method in accordance with the third exemplary embodiment of the present disclosure.

FIG. 9 is a flowchart depicting a program update method in accordance with the third exemplary embodiment of the present disclosure. In the meantime, the flowchart shown in FIG. 9 depicts processing that is to be executed in the update target program progressing processing completion wait unit 154 provided in the program update manager 15B. The processing of the flowchart shown in FIG. 9 is executed between the processing of step S12 and step S13 in FIG. 5.

When the processing of step S12 shown in FIG. 5 is executed, the non-update target program PA11 is paused. Specifically, the non-update target program PA11 is paused at the timing immediately before calling the non-update target program PA11 from the calling-side update target program PC11 or immediately after returning to the calling-side update target program PC11 from the non-update target program PA11. When the non-update target program PA11 is paused, the non-update target program calling stop unit 152 notifies the update target program progressing processing completion wait unit 154 of the pause.

Then, the update target program progressing processing completion wait unit 154 determines whether the processing of the update target program called by the non-update target program PA11 is in progress (step S41). When it is determined that the processing is in progress (step S41: YES) or when it is determined that it is indefinite (it is not possible to determine whether the processing is in progress), following processing is executed in the update target program progressing processing completion wait unit 154. That is, processing of waiting until all the update target programs called by the non-update target program PA11 complete the processing in progress is executed (step S42). In the meantime, when the processing of step S42 is executed, the processing of the flowchart shown in FIG. 9 is over.

Also, when it is determined in step S41 that the processing is not in progress (step S41: NO), the processing of the flowchart shown in FIG. 9 is over without executing the processing of step S42. When the processing of the flowchart shown in FIG. 9 is over, the update target program progressing processing completion wait unit 154 notifies the non-update target program calling stop unit 152 of the fact.

Then, the processing (step S13 in FIG. 5) of transferring the context CA11 of the non-update target program PA11 to the process control apparatus 20 and the processing (step S14 in FIG. 5) of notifying the engineering equipment 30 of the pause completion are sequentially executed in the communication management unit 151. Meanwhile, in the process control apparatus 20, the processing of resuming the non-update target program PA11 (non-update target program PA21) is executed in the similar manner to the first exemplary embodiment.

As described above, in the third exemplary embodiment, when the non-update target program PA11 which is not an update target, is paused in the process control apparatus 10 (active apparatus), based on the pause request transmitted from the engineering equipment 30, the following processing is executed. First, the update target program progressing processing completion wait unit 154 determines whether the processing of the update target program (the update target program called by the non-update target program PA11) is in progress. When the update target program progressing processing completion wait unit 154 determines that the update target program is in progress, the processing of waiting until all the update target programs complete the processing in progress is executed.

By the above processing, in the state in which the processing of the update target programs called from the non-update target program PA11 is all completed, the context CA11 of the non-update target program PA11 is transferred to the update apparatus. Thereby, it is possible to update the update target program in a short time while guaranteeing the continuation operation of the process control system 1.

Fourth Exemplary Embodiment

<Functional Configuration of Process Control System>

Figure 10:
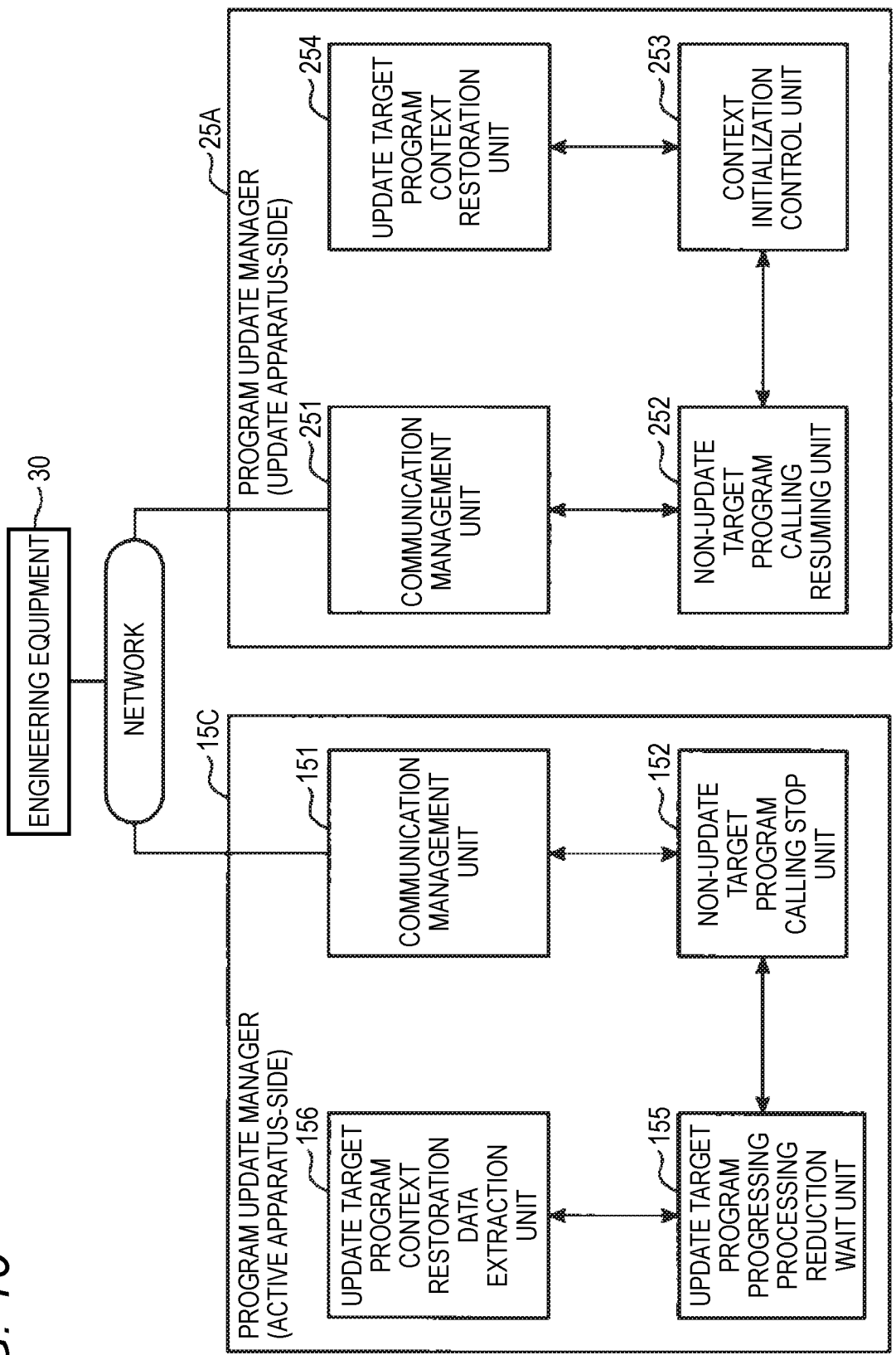
FIG. 10 is a functional block diagram depicting detailed functional configurations of program update managers (an active apparatus side and an update apparatus side), in a fourth exemplary embodiment of the present disclosure.

FIG. 10 is a functional block diagram depicting detailed functional configurations of program update managers (an active apparatus side and an update apparatus side), in a fourth exemplary embodiment of the present disclosure. In the meantime, in FIG. 10, the configurations corresponding to the configurations shown in FIG. 4 are denoted with the same reference numerals. Also, the functional configuration of the entire process control system of the fourth exemplary embodiment is similar to that described with reference to FIGS. 1 to 3. In the below, differences from the first exemplary embodiment are mainly described.

In the fourth exemplary embodiment, when there is an update target program, of which processing is required to be taken over to the update apparatus, of the update target programs called by the non-update target program PA11, the takeover of the processing of the update target program from the active apparatus to the update apparatus is enabled. In the fourth exemplary embodiment, in order to enable the takeover of the processing, restoration data, which is necessary to restore the context of the update target program of which processing is required to be taken over, is extracted and transferred from the active apparatus to the update apparatus, in addition to the context CA11 of the non-update target program PA11. Then, in the update apparatus, the context of the update target program is restored using the transferred restoration data.

As shown in FIG. 10, in the fourth exemplary embodiment, a program update manager 15C of the active apparatus has such a configuration that an update target program progressing processing reduction wait unit 155 and an update target program context restoration data extraction unit 156 are added to the program update manager 15 of the active apparatus shown in FIG. 4. Also, a program update manager 25A of the update apparatus has such a configuration that an update target program context restoration unit 254 is added to the program update manager 25 shown in FIG. 4.

When the non-update target program calling stop unit 152 executes the processing of pausing the non-update target program PA11, the update target program progressing processing reduction wait unit 155 determines whether there is an update target program, of which processing is in progress, of a plurality of update target programs called by the non-update target program PA11. The update target program progressing processing reduction wait unit 155 executes following processing when it is determined that there is even one update target program, of which processing is in progress, of the update target programs.

That is, the update target program progressing processing reduction wait unit 155 makes a setting for aggregating the processing in progress in an update target program (pre-registered update target program), of which specification is publicized, of the plurality of update target programs called by the non-update target program PA11. Specifically, a setting is made so that a request of the update target program of which specification is publicized is not to be transmitted to the other update target programs. Then, it waits that the processing of the update target program is to stop. The "update target program of which specification is publicized" means a system call, a common library or the like of which specification is clearly defined and publicized.

When the update target program progressing processing reduction wait unit 155 confirms that the processing of the update target program is stopped, it requests the update target program context restoration data extraction unit 156 to extract the restoration data. In the meantime, when the update target program context restoration data extraction unit 156 notifies the extraction completion of the restoration data, the update target program progressing processing reduction wait unit 155 notifies the non-update target program calling stop unit 152 of the extraction completion.

When the extraction of the restoration data is requested from the update target program progressing processing reduction wait unit 155, the update target program context restoration data extraction unit 156 executes processing of extracting, from a context of the update target program of which specification is publicized, the restoration data necessary to restore the context. When the extraction of the restoration data is completed, the update target program context restoration data extraction unit 156 notifies the extraction completion to the update target program progressing processing reduction wait unit 155.

When the restoration of the context is requested from the context initialization control unit 253, the update target program context restoration unit 254 restores the context of the update target program of which specification is publicized by using the restoration data transferred from the active apparatus and a publicized processing request procedure. When the restoration of the context is completed, the update target program context restoration unit 254 notifies the context initialization control unit 253 of the restoration completion.

Here, an example in which a function of the update target program of which specification is publicized is the communication between tasks and a context to be restored is a mail box (accumulation of unread messages in the communication between tasks) obtained as a result of processing of the communication between tasks is considered. In this example, the update target program progressing processing reduction wait unit 155 makes a setting of permitting a newly transmitted message to be saved but preventing the update target program from reading out the accumulated unread message, for the inter-task communication function, thereby waiting for the processing of the update target program to be stopped. The setting is implemented by the update target program progressing processing reduction wait unit 155 requesting the operating system 12 to stop the system call for extracting a request from the communication between tasks, for example.

For example, when the communication between tasks is the update target program PB13 shown in FIG. 2, the update target program progressing processing reduction wait unit 155 makes a setting so that a request of the update target program PB13 is not to be transmitted to the update target programs PB12 and PB14. In the meantime, the update target programs PB12 and PB14 may request the update target program PB13 to execute the processing. After making the setting, the update target program progressing processing reduction wait unit 155 waits for the processing of the update target program to be stopped.

In the example, items of the restoration data to be extracted by the update target program context restoration data extraction unit 156 are within a range defined in a functional specification of the main box, and are exemplified, as follows. As a first example, the restoration data includes generation information of the main box. The generation information of the mail box is the maximum number of messages to be stored and an upper limit size of one message (for example, the number of bytes). Also, as a second example, the restoration data is transmission information (sending task ID, destination task II), date and time, urgency and a message body) of an individual message (only unread message).

When the restoration data is transferred from the active apparatus to the update apparatus, processing of generating a mail box, instead of the corresponding task, on the basis of the first restoration data is executed in the update target program context restoration unit 254. Also, on the update apparatus-side, processing of mail-transmitting a message, instead of the corresponding task, on the basis of the second restoration data and sequentially accumulating the message on the main box is executed.

<Program Update Method>

Figure 11:
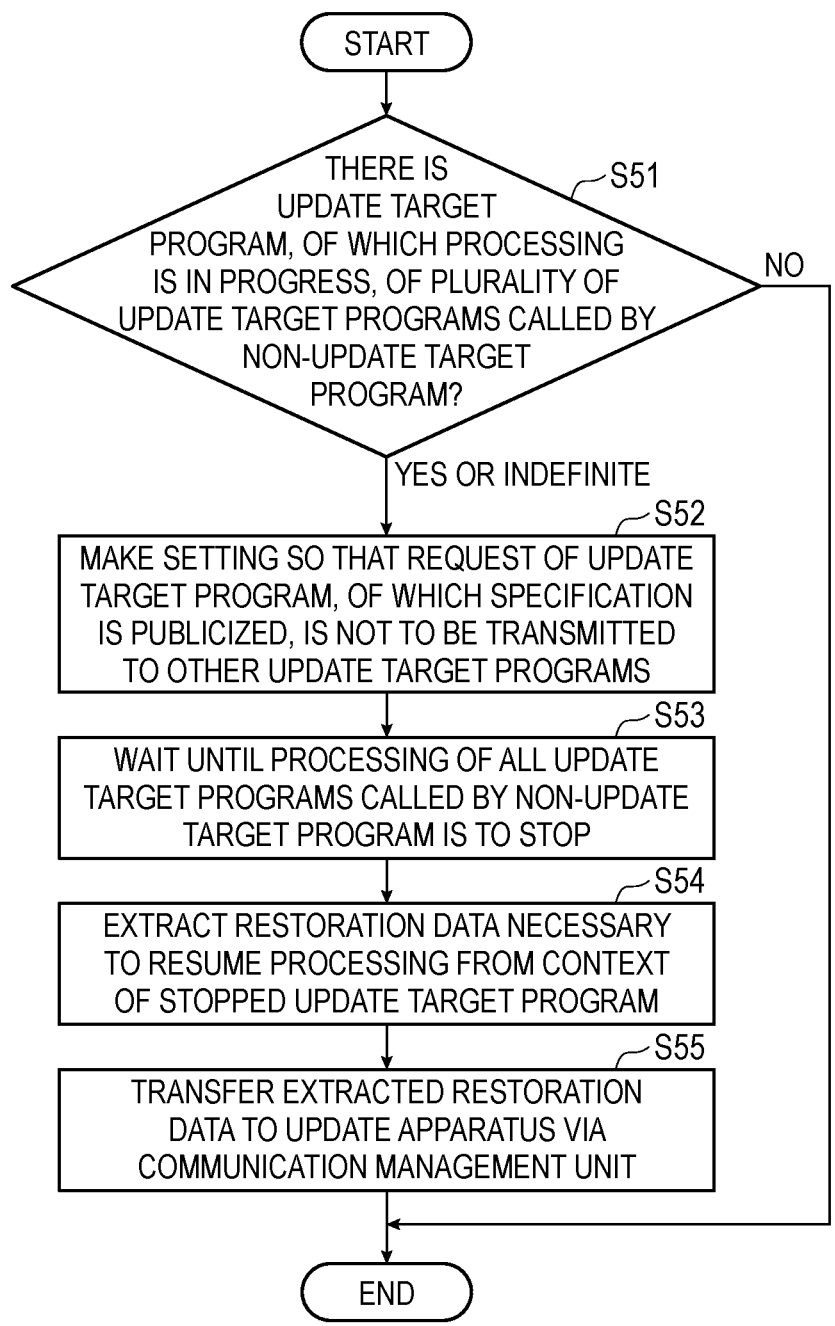
FIG. 11 is a flowchart depicting a program update method in accordance with the fourth exemplary embodiment of the present disclosure.
Figure 12:
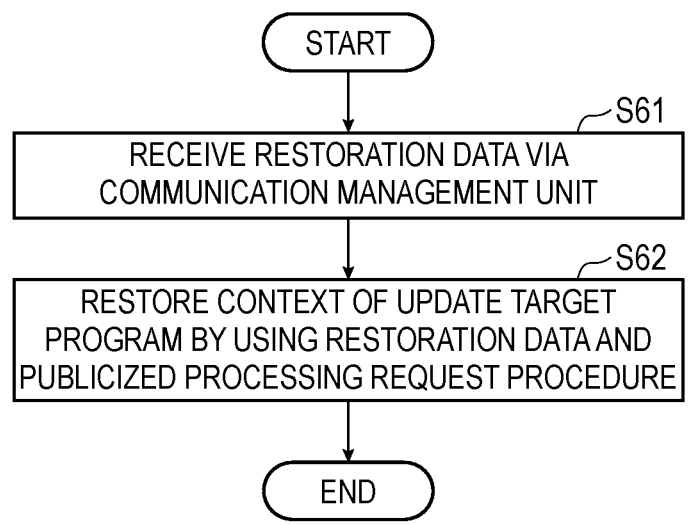
FIG. 12 is a flowchart depicting the program update method in accordance with the fourth exemplary embodiment of the present disclosure.

FIGS. 11 and 12 are flowcharts depicting a program update method in accordance with the fourth exemplary embodiment of the present disclosure. In the meantime, the flowchart shown in FIG. 11 depicts processing that is to be executed in the update target program progressing processing reduction wait unit 155 and update target program context restoration data extraction unit 156 provided in the program update manager 15C. The processing of the flowchart shown in FIG. 11 is executed between the processing of step S12 and step S13 in FIG. 5. Also, the flowchart shown in FIG. 12 depicts processing that is to be executed in the update target program context restoration unit 254 provided in the program update manager 25A. The processing of the flowchart shown in FIG. 12 is executed between the processing of step S26 and step S27 in FIG. 5.

When the processing of step S12 shown in FIG. 5 is executed, the non-update target program PA11 is paused, and the non-update target program calling stop unit 152 notifies the update target program progressing processing reduction wait unit 155 of the pause. Then, the update target program progressing processing reduction wait unit 155 determines whether there is an update target program, of which processing is in progress, of the plurality of update target programs called by the non-update target program PA11 (step S51).

The update target program progressing processing reduction wait unit 155 executes following processing when it is determined that there is even one update target program, of which processing is in progress (step S51: YES) or when it is determined that it is indefinite (it is not possible to determine whether the processing is in progress), the update target program progressing processing reduction wait unit 155 executes following processing. That is, the update target program progressing processing reduction wait unit 155 executes processing of making a setting so that a request of the update target program, of which specification is publicized, is not to be transmitted to the other update target programs (step S52).

When the above setting processing is over, the update target program progressing processing reduction wait unit 155 waits until the processing of all the update target programs called by the non-update target program PA11 is stopped (step S52). When it is confirmed that the processing of all the update target programs called by the non-update target program PA11 is stopped, the update target program progressing processing reduction wait unit 155 requests the update target program context the restoration data extraction unit 156 to extract the restoration data.

When the request for extraction of the restoration data is issued, the update target program context restoration data extraction unit 156 executes processing of extracting, from a context of the stopped update target program (the update target program of which specification is publicized), the restoration data necessary to restore the context (step S54). When the extraction of the restoration data is completed, the update target program context restoration data extraction unit 156 notifies the update target program progressing processing reduction wait unit 155 of the extraction completion.

When the update target program context restoration data extraction unit 156 notifies of the extraction completion, the update target program progressing processing reduction wait unit 155 notifies the non-update target program calling stop unit 152 of the fact (extraction completion). Then, the restoration data extracted by the update target program context restoration data extraction unit 156 is transferred to the update apparatus via the communication management unit 151 (step S55). When the above processing is executed, the processing of the flowchart shown in FIG. 11 is over. On the other hand, when it is determined in step S51 that there is no update target program of which processing is in progress (step S51: NO), the processing of the flowchart shown in FIG. 11 is over.

Then, the processing (step S13 in FIG. 5) of transferring the context CA11 of the non-update target program PA11 to the process control apparatus 20 and the processing (step S14 in FIG. 5) of notifying the engineering equipment 30 of the pause completion are sequentially executed in the communication management unit 151.

When the resuming request is transmitted from the engineering equipment 30 to the update apparatus, the processing of steps S21 to S26 shown in FIG. 5 is executed, like the first exemplary embodiment. Here, when the processing of step S26 is over, the context initialization control unit 253 requests the update target program context restoration unit 254 to restore the context. Then, the update target program context restoration unit 254 executes processing of receiving the restoration data via the communication management unit 251 (step S61).

Then, the update target program context restoration unit 254 executes processing of restoration the context of the update target program of which specification is publicized by using the received restoration data and a publicized processing request procedure (step S62). When the restoration of the context is completed, the update target program context restoration unit 254 notifies the context initialization control unit 253 of the restoration completion.

Then, the non-update target program calling resuming unit 252 executes processing of resuming the calling of the non-update target program PA11 (non-update target program PA21) (step S27 in FIG. 5). When the resuming of the non-update target program PA11 (non-update target program PA21) is completed, the non-update target program calling resuming unit 252 notifies the communication management unit 251 of the completion of the resuming processing. When the notification is made, the communication management unit 251 notifies the engineering equipment 30 (step S28 in FIG. 5) of the completion of the resuming processing.

As described above, in the fourth exemplary embodiment, when it is determined that there is an update target program, of which processing is in progress, of the update target programs called by the non-update target program PA11, the active apparatus makes a setting so that the request of the update target program, of which specification is publicized, of the update target programs is not to be transmitted to the other update target programs, and waits that the processing of the update target program is to stop. Then, the restoration data necessary to resume the processing is extracted from the context of the update target program of which specification is publicized.

Also, in the fourth exemplary embodiment, the update apparatus restores the context of the update target program (the update target program of which specification is publicized) after the update by using the restoration data transferred from the active apparatus. Then, when the restoration of the context is completed, the calling of the non-update target program PA11 (PA21) is resumed.

By the above processing, in addition to the context CA11 of the non-update target program PA11 on the active apparatus-side, it is possible to restore the context of the update target program, of which specification is publicized, of the update target programs called from the non-update target program PA11, on the update apparatus-side. Thereby, even when there is an update target program, of which processing is required to be taken over to the update apparatus-side, of the update target programs called by the non-update target program PA11, it is possible to update the update target program in a short time while guaranteeing the continuation operation of the process control system 1.

Fifth Exemplary Embodiment

Figure 13:
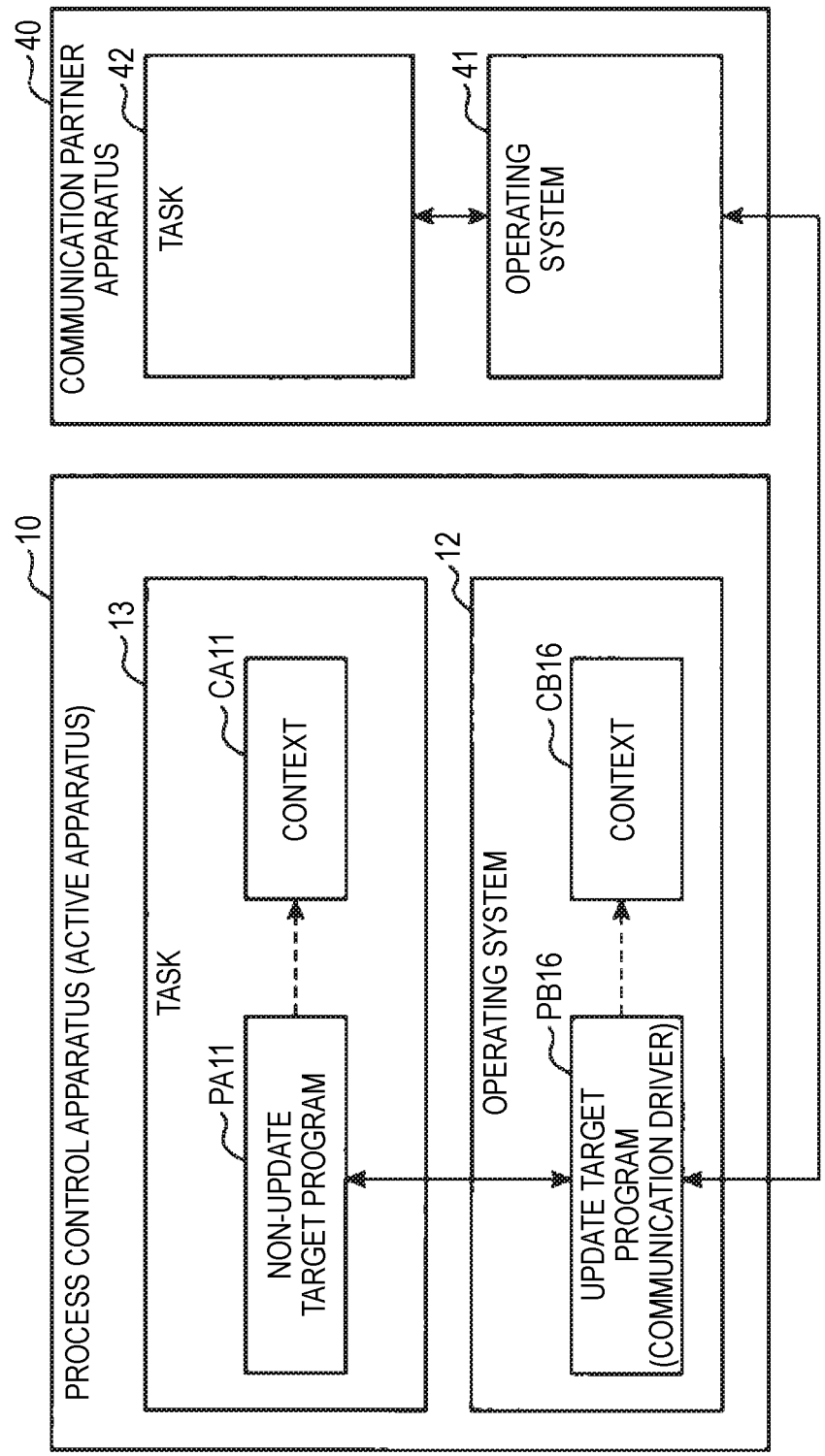
FIG. 13 is a functional configuration view depicting a schematic functional configuration of a process control system in accordance with a fifth exemplary embodiment of the present disclosure.

FIG. 13 is a functional configuration view depicting a schematic functional configuration of a process control system in accordance with a fifth exemplary embodiment of the present disclosure. In FIG. 13, the configurations corresponding to those shown in FIGS. 1 and 2 are denoted with the same reference numerals. Also, in FIG. 13, only the functional configurations necessary to describe the fifth exemplary embodiment are shown. For this reason, in FIG. 13, for example, the process control apparatus 10, the engineering equipment 30 or the like shown in FIG. 1 are not shown. Meanwhile, in the fifth exemplary embodiment, the program update managers 15 and 25 are respectively provided in the active apparatus and the update apparatus shown in FIG. 4. In the below, differences from the second exemplary embodiment are mainly described.

In the second exemplary embodiment, considering only the process control apparatus 10, when there is processing in progress on the update target program called from the non-update target program PA11, the processing is rapidly broken off. Here, when there is a communication partner apparatus 40 (other apparatus) configured to perform communication with the process control apparatus 10, it is necessary to continue the communication processing in progress so that a problem such as a communication error is not to occur, considering a request to the process control apparatus 10 from the communication partner apparatus 40, in addition to the calling (request) from the non-update target program PA11.

The reason is that the pause of the process control apparatus 10 is not to be perceived by continuing the communication processing in progress. That is, even when the process control apparatus 10 is paused, the communication partner apparatus 40 is made to perceive as if the process control apparatus 10 continues to operate. In the fifth exemplary embodiment, even in the case in which there is the communication partner apparatus 40, the communication partner apparatus 40 is made not to perceive the pause of the process control apparatus 10, so that it is possible to update the update target program in a short time while guaranteeing the continuation operation of the process control system 1.

As shown in FIG. 13, the operating system 12 has an update target program PB16, as one of the update target programs. The update target program PB16 is a communication driver configured to enable communication between a task (for example, the task 13) operating on the operating system 12 and a task (for example, the task 42 operating on an operating system 41 of the communication partner apparatus 40) operating on the communication partner apparatus 40. In the fifth exemplary embodiment, a request/response protocol is mounted on the communication driver, so that delivery confirmation/retransmission of the request and reception deduplication between a request task, which is a processing request source, and a response task, which is a processing execution destination, are implemented.

In the request/response protocol, the request task allocates and transmits a communication data ID to communication data, and the response task allocates and replies the communication data ID). The communication data ID) is an identifier for uniquely specifying the communication data, and is, for example, a sequence number. The communication function having the request/response protocol includes GET communication of Vnet, Client-Server communication of FF (Foundation Fieldbus (registered trademark) association), DP-V1 communication of PROFIBUS (registered trademark), or the like.

Figure 14:
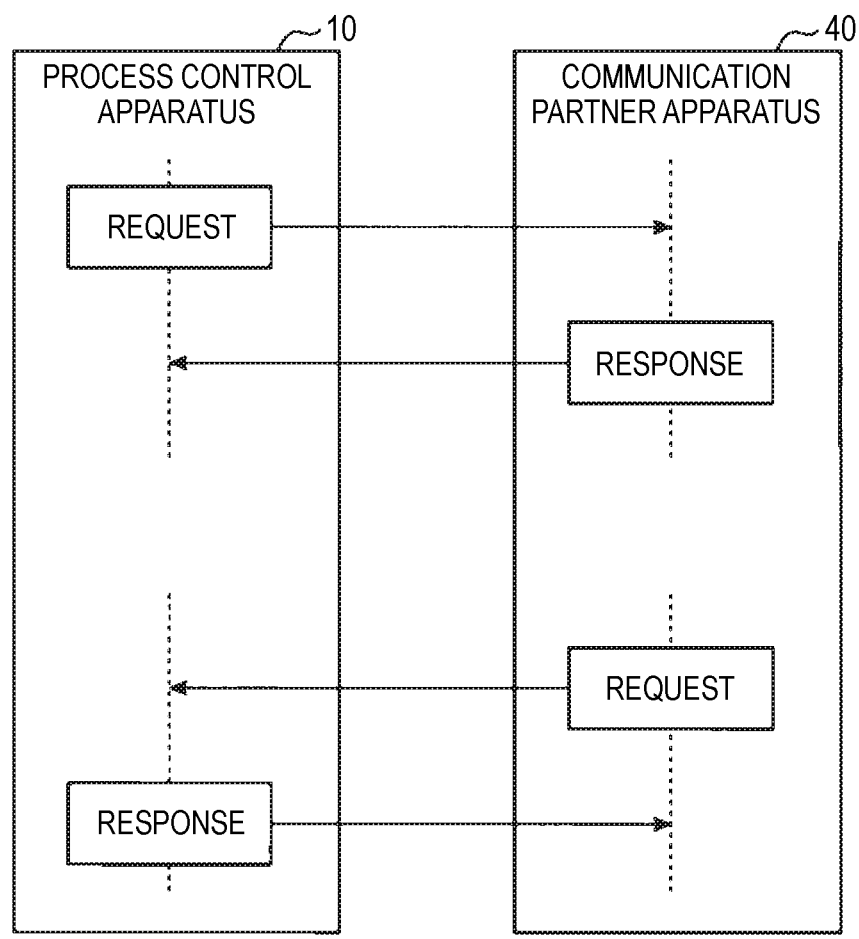
FIG. 14 illustrates a request/response protocol that is to be used in the fifth exemplary embodiment of the present disclosure.

FIG. 14 illustrates a request/response protocol that is to be used in the fifth exemplary embodiment of the present disclosure. As shown in FIG. 14, in the request/response protocol, when the process control apparatus 10 (task 13) transmits (notifies) a request to the communication partner apparatus 40 (task 42), the process control apparatus 10 (task 13) waits for return of a response from the communication partner apparatus 40 (task 42). When the requested processing (first predetermined processing) over, the communication partner apparatus 40 (task 42) having received the request replies (notifies) a response indicative of a result of the processing. When the process control apparatus 10 (task 13) having transmitted the request receives the response replied from the communication partner apparatus 40 (task 42), the processing in progress is completed.

In contrast, when the communication partner apparatus 40 (task 42) transmits a request to the process control apparatus 10 (task 13), the communication partner apparatus 40 (task 42) waits for return of a response from the process control apparatus 10 (task 13). When the requested processing (second predetermined processing) is over, the process control apparatus 10 (task 13) having received the request replies a response indicative of a result of the processing.

Here, in a case in which a usual universal communication protocol (for example, TCP/IP) is used, when the request from the communication partner apparatus 40 is normally received by the process control apparatus 10, an acknowledgment (ACK) is replied from the process control apparatus 10 to the communication partner apparatus 40 even though the processing requested from the communication partner apparatus 40 is not over in the process control apparatus 10. In contrast, in a case in which the request/response protocol is used, a response is not replied from the process control apparatus 10 to the communication partner apparatus 40 until the processing requested from the communication partner apparatus 40 is over in the process control apparatus 10. That is, in the case in which the usual universal communication protocol is used, highly reliable communication is implemented between the communication drivers. However, in the case in which the request/response protocol is used, the highly reliable communication is implemented on all paths interconnecting the request task and the response task.

Here, when updating the active apparatus, in which the response task is operating, on the online, the response data may be lost by the online update. Even in this case, since the communication driver of the request task monitors the receiving of the response data by the request/response protocol, when the response data is not received within a predetermined time, the request data for the response data is retransmitted. As a result, since the loss of the response data is recovered, even when the active apparatus, in which the response task is operating, is updated on the online, it is possible to disable the request task of the communication partner apparatus from perceiving the online update.

In contrast, when updating the active apparatus, in which the request task is operating, on the online, the request data may be lost by the online update. In this case, it is not possible to recover the loss of the request data in the request/response protocol. Therefore, in a case in which the request task has already transmitted the request data toward the response task and the update target program is in progress, upon the pause of the online update, the stop position of the non-update target program PA11 is placed back into a state (a state before the update target program is in progress) immediately before the request is transmitted to the update target program. Thereby, the loss of the request data is recovered.

As described above, in the fifth exemplary embodiment, the communication is performed using the request/response protocol between the process control apparatus 10 and the communication partner apparatus 40. Thereby, when the response is not obtained within a predetermined time, the request for the response is retransmitted. As a result, even in the case in which there is the communication partner apparatus 40, it is possible to update the update target program in a short time while guaranteeing the continuation operation of the process control system 1.

Sixth Exemplary Embodiment

<Functional Configuration of Process Control System>

Figure 15:
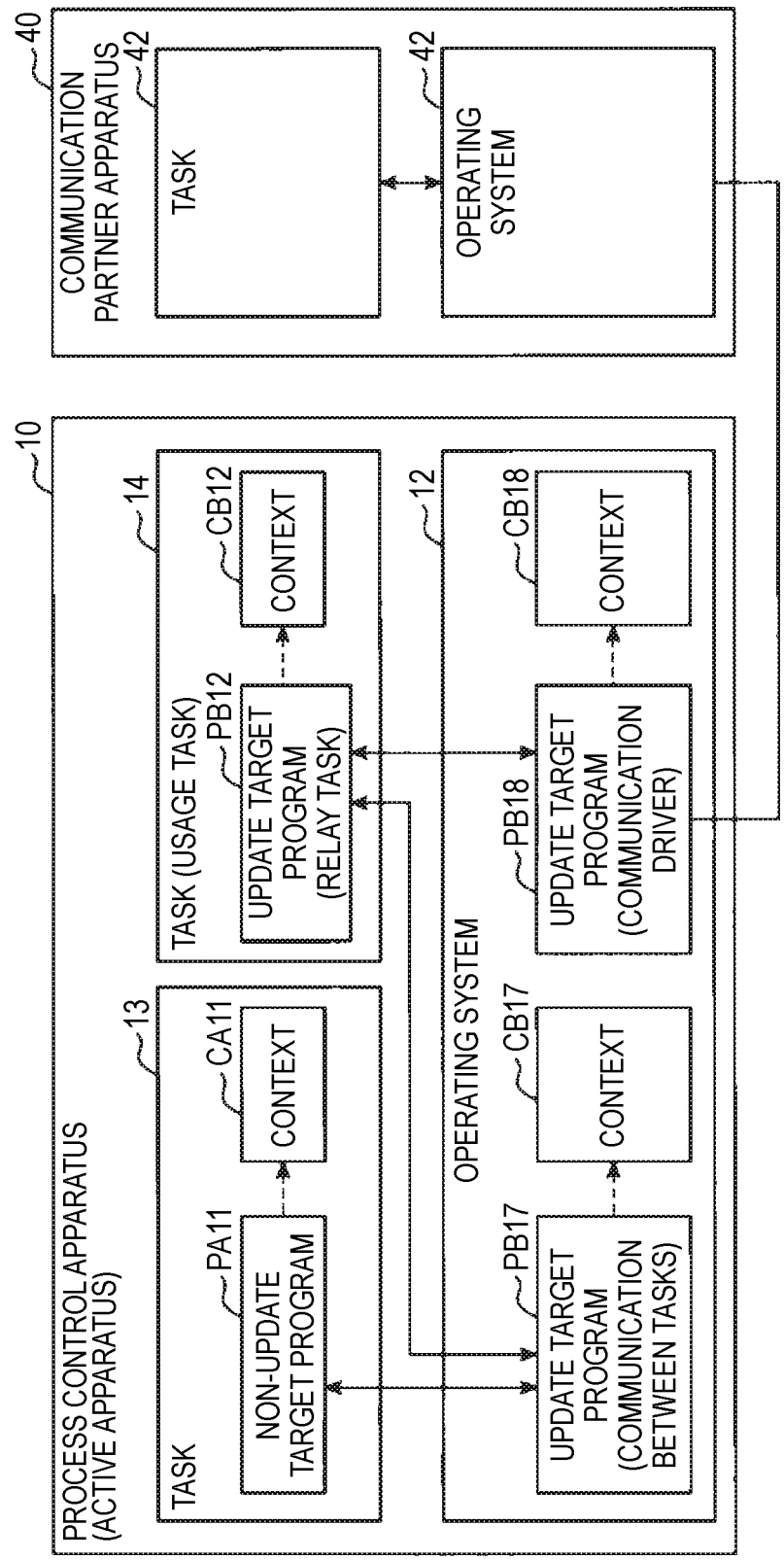
FIG. 15 is a functional configuration view depicting a schematic functional configuration of a process control system in accordance with a sixth exemplary embodiment of the present disclosure.

FIG. 15 is a functional configuration view depicting a schematic functional configuration of a process control system in accordance with a sixth exemplary embodiment of the present disclosure. In FIG. 15, the configurations corresponding to those shown in FIGS. 1, 2 and 13 are denoted with the same reference numerals. Also, in FIG. 15, only the functional configurations necessary to describe the sixth exemplary embodiment are shown. For this reason, in FIG. 15, for example, the process control apparatus 10, the engineering equipment 30 or the like shown in FIG. 1 are not shown. In the below, differences from the first exemplary embodiment are mainly described.

The third exemplary embodiment is designed to wait for processing to be entirely completed when there is processing in progress on the update target program called from the non-update target program PA11, considering only the process control apparatus 10. After all the processing is completed, the context CA11 of the non-update target program PA11 is transferred to the update apparatus, so that the continuation operation of the process control system 1 is guaranteed.

Here, in the case in which there is the communication partner apparatus 40 configured to perform communication with the process control apparatus 10, after the non-update target program is paused, it is required that a new request is not to be received from the communication partner apparatus 40. This is to reduce the processing in progress in the communication processing to zero. That is, when there is no new request from the communication partner apparatus 40, the processing in progress is over if a response to the received request is replied. Also, the calling of the non-update target program PA11 is also stopped. However, the processing for which the request has been already made is over when a response is received. In this way, in the sixth exemplary embodiment, even when there is the communication partner apparatus 40, a new request is not received from the communication partner apparatus 40 but a response is received, so that it is possible to update the update target program in a short time while guaranteeing the continuation operation of the process control system 1.

As shown in FIG. 15, the operating system 12 has, as the update target program, update target programs PB17 and PB18. The update target program PB17 provides a communication function between tasks (for example, the tasks 13 and 14) operating on the operating system 12. The update target program PB18 is a communication driver configured to enable communication between the task (for example, the task 14) operating on the operating system 12 and the communication partner apparatus 40.

The communication driver (update target program PB18) is configured to perform communication by using the universal communication protocol (for example, TCP/IP). In the case in which the communication driver (update target program PB18) performs communication by using the TCP/IP, delivery confirmation/retransmission of a message and deduplication are carried out. That is, the communication driver (update target program PB18) waits for an acknowledgment (ACK) when data is transmitted, retransmits the data when the acknowledgment is not received, and eliminates duplication when there is duplicate data when receiving the data.

On the operating system 12, the tasks 13 and 14 operate. In the task 13, the non-update target program PA11 operates, like the task 13 shown in FIG. 13. In the task 14 (usage task), the update target program PB12 operates. The update target program PB12 functions as an interface to the update target program PB18. That is, the non-update target program PA11 of the task 13 can access the update target program PB18 (communication driver) via the update target program PB17 (communication between tasks) and the update target program PB12 (relay task).

Therefore, the non-update target program PA11 of the task 13 can perform two-way communication with the communication partner apparatus 40 via the update target program PB17 (communication between tasks), the update target program PB12 (relay task), and the update target program PB18 (communication driver). Specifically, the non-update target program PA11 of the task 13 can perform two-way communication with a task 42 operating on the operating system 41 of the communication partner apparatus 40, for example. In the meantime, communication is performed using the universal communication protocol such as TCP/IP between the task 13 and the task 42.

In the meantime, the non-update target program PA11 operating on the task 13 has the context CA11. The update target program PB12 operating on the task 14 has the context CB12. Also, the update target program PB17 of the operating system 12 has the context CB17, and the update target program PB18 has the context CB18.

Figure 16:
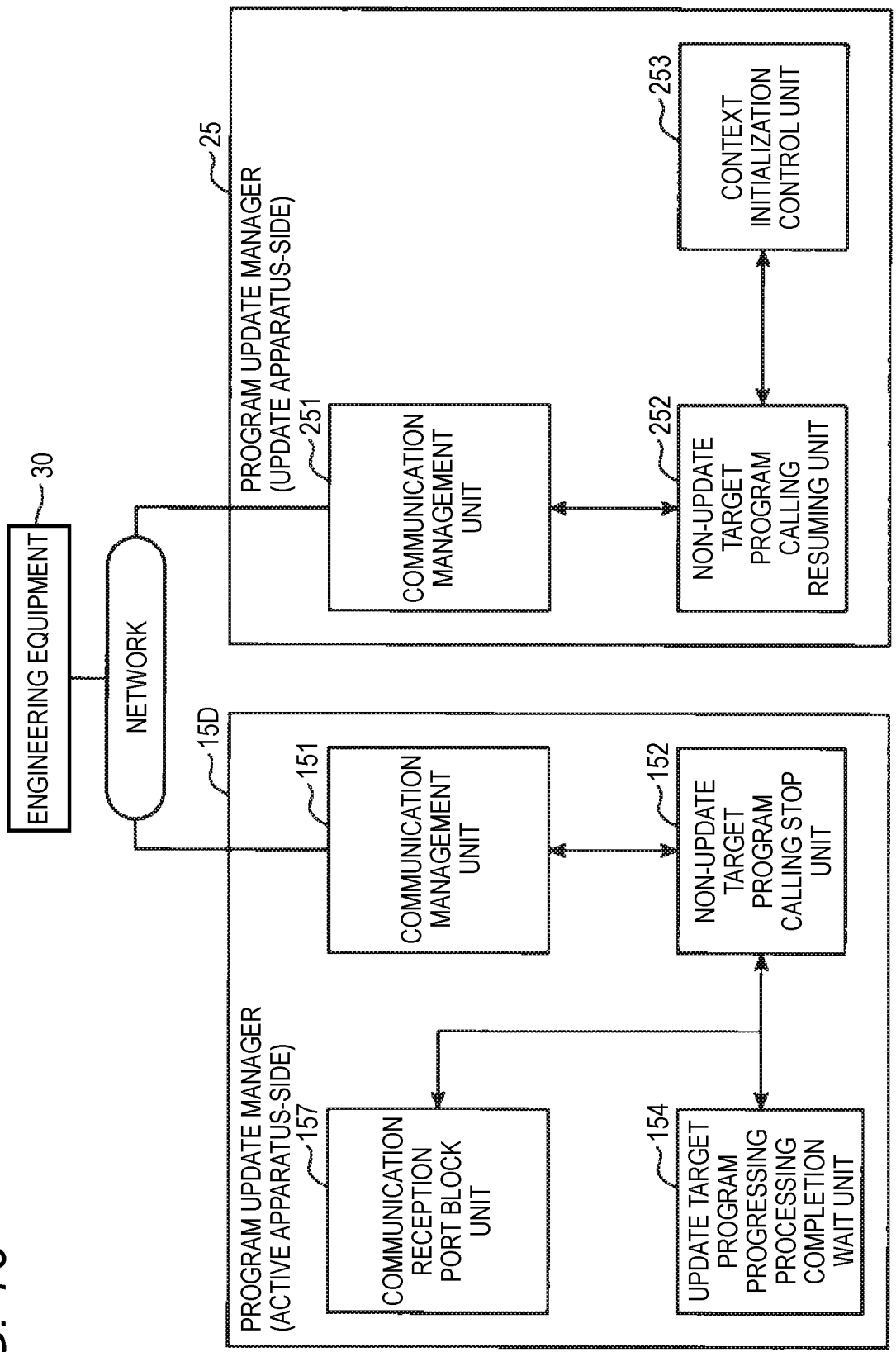
FIG. 16 is a functional block diagram depicting detailed functional configurations of program update managers (an active apparatus side and an update apparatus side), in the sixth exemplary embodiment of the present disclosure.

FIG. 16 is a functional block diagram depicting detailed functional configurations of program update managers (an active apparatus side and an update apparatus side), in the sixth exemplary embodiment of the present disclosure. In FIG. 16, the configurations corresponding to those shown in FIG. 8 are denoted with the same reference numerals. As shown in FIG. 16, in the sixth exemplary embodiment, a program update manager 15D on the active apparatus-side has such a configuration that a communication reception port block unit 157 is added to the program update manager 15B on the active apparatus-side shown in FIG. 8. In the meantime, the program update manager 25 on the update apparatus-side has the same configuration as FIG. 8.

The communication reception port block unit 157 is configured to block a reception port of the communication driver (for example, the update target program PB18 shown in FIG. 15) so that a request for new processing is not to be received from an external device (for example, the communication partner apparatus 40). When there is a request from the non-update target program calling stop unit 152, the communication reception port block unit 157 immediately blocks the reception port of the communication driver. The communication reception port block unit 157 is requested to start processing by the non-update target program calling stop unit 152, earlier than the update target program progressing processing completion wait unit 154. The reception port of the communication driver is blocked by the communication reception port block unit 157 that uses a function of the operating system 12 to operate a reception interruption mask, for example.

In the meantime, in the case in which the communication driver performs communication by using the universal communication protocol, even though the reception port of the communication driver is temporarily blocked, when the communication is resumed within a retransmission period, the loss of data can be prevented. In the meantime, the "retransmission period" is a period having a length obtained by multiplying a number of retransmission times N by a waiting time (waiting time of a response) Tw after a request is transmitted until a next request is transmitted.

<Program Update Method>

Figure 17:
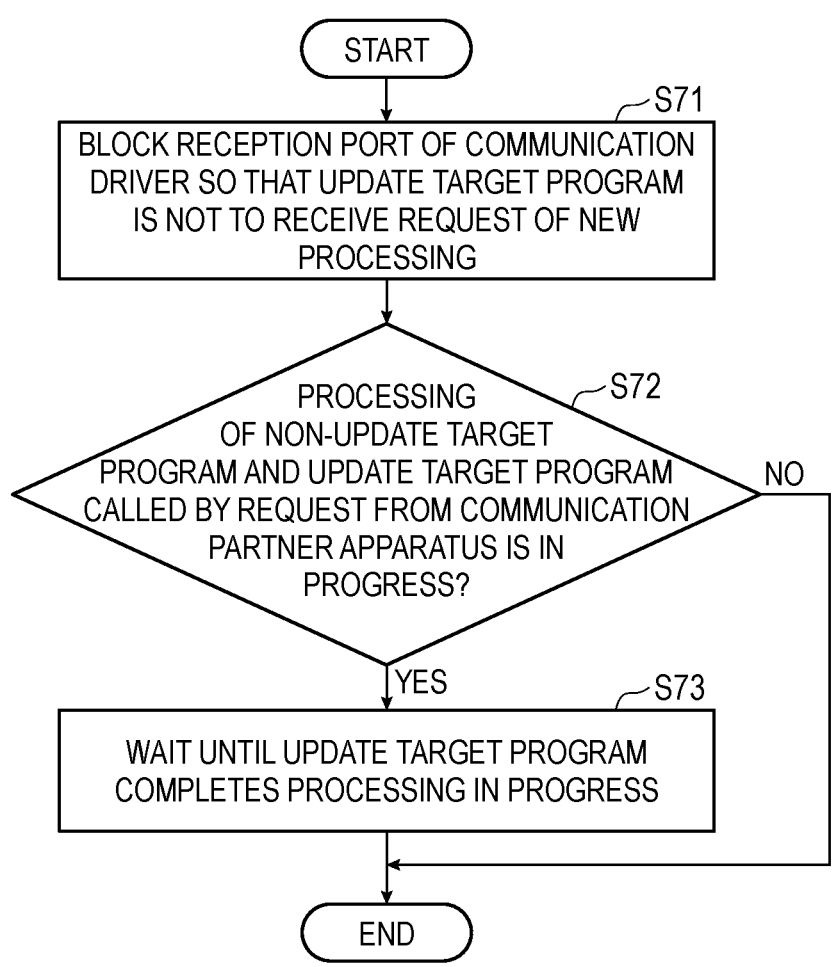
FIG. 17 is a flowchart depicting a program update method in accordance with the sixth exemplary embodiment of the present disclosure.

FIG. 17 is a flowchart depicting a program update method in accordance with the sixth exemplary embodiment of the present disclosure. In the meantime, the flowchart shown in FIG. 17 depicts processing that is to be executed by the update target program progressing processing completion wait unit 154 and the communication reception port block unit 157 provided in the program update manager 15D. The processing of the flowchart shown in FIG. 17 is executed between step S12 and step S13 in FIG. 5.

When the processing of step S12 shown in FIG. 5 is executed, the non-update target program PA11 is paused. Specifically, the non-update target program PA11 is paused at timing immediately before calling the non-update target program PA11 from the calling-side update target program PC11 or immediately after returning to the calling-side update target program PC11 from the non-update target program PA11. When the non-update target program PA11 is paused, the communication reception port block unit 157 is requested to start processing from the non-update target program calling stop unit 152. Then, the communication reception port block unit 157 immediately executes processing of blocking the reception port of the communication driver so that the communication driver (the update target program PB18 shown in FIG. 15) is not to receive a request for new processing (step S71).

When the processing of blocking the reception port of the communication driver is completed, the communication reception port block unit 157 notifies the non-update target program calling stop unit 152 of the processing completion. When the communication reception port block unit 157 notifies of the processing completion, the update target program progressing processing completion wait unit 154 is requested to start processing from the non-update target program calling stop unit 152. Then, the update target program progressing processing completion wait unit 154 determines whether the processing of the update target program called by the non-update target program PA11 and the update target program called by the request from the communication partner apparatus 40 is in progress (step S72).

When it is determined that the processing is in progress (step S72: YES), the update target program progressing processing completion wait unit 154 executes following processing. That is, processing of waiting until the update target program called by non-update target program PA11 and the update target program called by the request from the communication partner apparatus 40 are to complete the processing in progress is executed (step S73). In the meantime, when the processing of step S73 is executed, the processing of the flowchart shown in FIG. 17 is over.

Also, when it is determined in step S72 that the processing is not in progress (step S72: NO), the processing of the flowchart shown in FIG. 17 is over without executing the processing of step S73. When the processing of the flowchart shown in FIG. 17 is over, the update target program progressing processing completion wait unit 154 notifies the non-update target program calling stop unit 152 of the fact.

Then, the processing (step S13 in FIG. 5) of transferring the context CA11 of the non-update target program PA11 to the process control apparatus 20 and the processing (step S14 in FIG. 5) of notifying the engineering equipment 30 of the pause completion are sequentially executed in the communication management unit 151. Meanwhile, in the process control apparatus 20, the processing of resuming the non-update target program PA11 (non-update target program PA21) is executed in the similar manner to the first exemplary embodiment.

As described above, in the sixth exemplary embodiment, when the non-update target program PA11, which is not an update target, is paused in the process control apparatus 10 (active apparatus), based on the pause request from the engineering equipment 30, following processing is executed. First, the communication reception port block unit 157 executes the processing of blocking the reception port of the communication driver (the update target program PB18 shown in FIG. 18).

Then, the update target program progressing processing completion wait unit 154 determines whether the processing of the update target program called by the non-update target program PA11 and the update target program called by the request from the communication partner apparatus 40 is in progress. When the update target program progressing processing completion wait unit 154 determines that the processing of the update target programs is in progress, it waits until all the update target programs complete the processing in progress.

By the above processing, the context CA11 of the non-update target program PA11 is transferred to the update apparatus in the state in which the processing of the update target program called by the non-update target program PA11 and the update target program called by the request from the communication partner apparatus 40 is all completed. Thereby, even when there is the communication partner apparatus 40, it is possible to update the update target program in a short time while guaranteeing the continuation operation of the process control system 1.

Seventh Exemplary Embodiment

<Functional Configuration of Process Control System>

Figure 18:
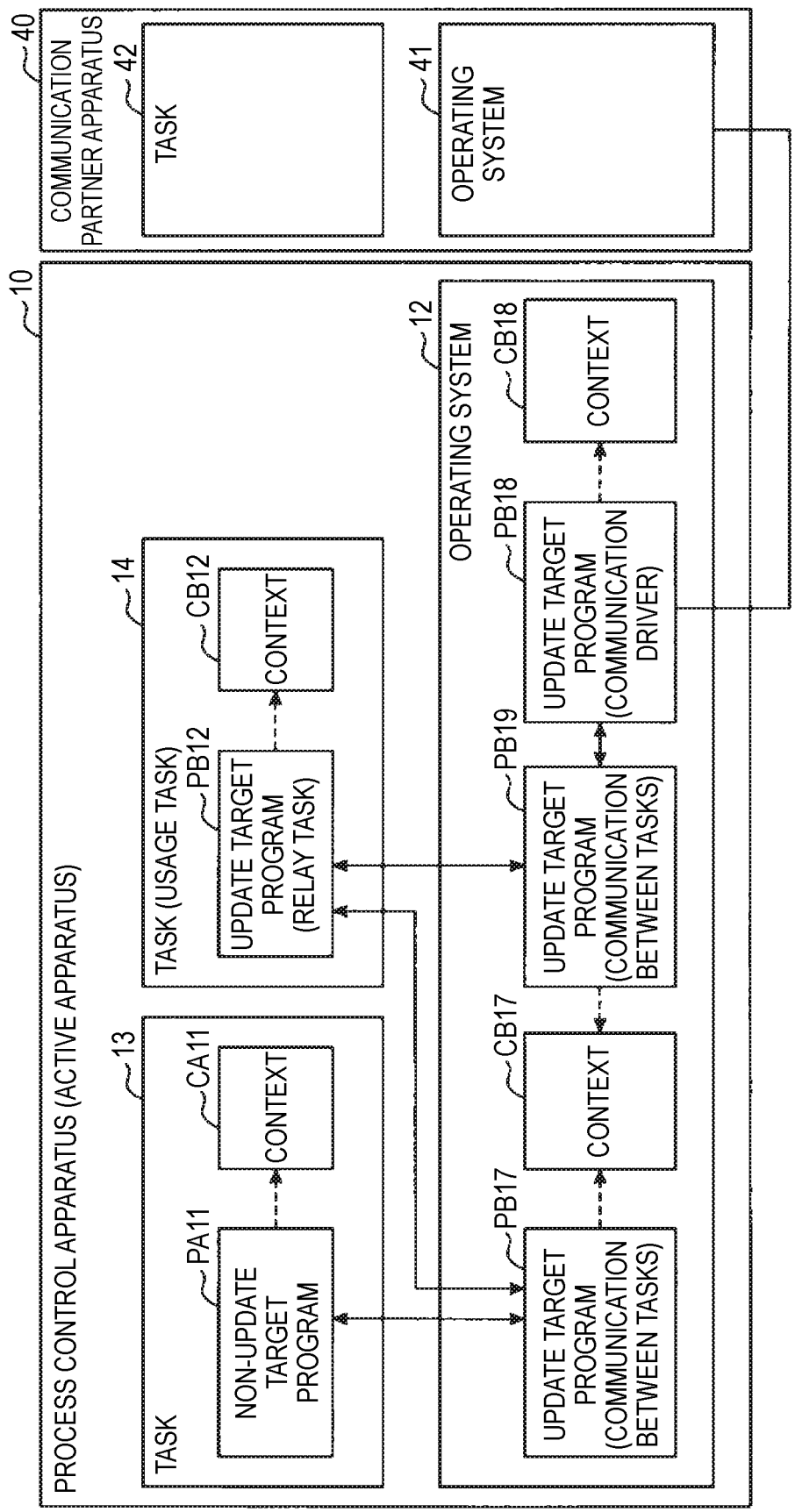
FIG. 18 is a functional configuration view depicting a schematic functional configuration of a process control system in accordance with a seventh exemplary embodiment of the present disclosure.

FIG. 18 is a functional configuration view depicting a schematic functional configuration of a process control system in accordance with a seventh exemplary embodiment of the present disclosure. In FIG. 18, the configurations corresponding to those shown in FIG. 15 are denoted with the same reference numerals. Also, in FIG. 18, only the functional configurations necessary to describe the seventh exemplary embodiment are shown. For this reason, in FIG. 18, for example, the process control apparatus 10, the engineering equipment 30 or the like shown in FIG. 1 are not shown. In the below, differences from the fourth exemplary embodiment are mainly described.

In the fourth exemplary embodiment, considering only the process control apparatus 10, when there is an update target program, of which processing is required to be taken over to the update apparatus, of the update target programs called by the non-update target program PA11, the processing of the update target program is taken over from the active apparatus to the update apparatus. Here, like the sixth exemplary embodiment, when there is the communication partner apparatus 40 configured to perform communication with the process control apparatus 10, it is required not to receive a new request from the communication partner apparatus 40 after the non-update target program PA11 is paused. In the seventh exemplary embodiment, even when there is the communication partner apparatus 40, a new request is not received from the communication partner apparatus 40, so that it is possible to update the update target program in a short time while guaranteeing the continuation operation of the process control system 1.

As shown in FIG. 18, the operating system 12 has, as the update target program, an update target program PB19, in addition to the update target programs PB17 and PB18. The update target program PB19 provides a function (inter-task communication function) of communication between tasks operating on the operating system 12, like the update target program PB17. Meanwhile, in FIG. 18, contexts of the update target program PB17, PB19 are collectively shown as a context CB17.

The non-update target program PA11 of the task 13 can perform two-way communication with the communication partner apparatus 40 via the update target program PB17 (communication between tasks), the update target program PB12 (relay task), the update target program PB19 (communication between tasks), and the update target program PB18 (communication driver). In the meantime, communication is performed using the universal communication protocol such as TCP/IP between the task 14 and the task 42 of the communication partner apparatus 40.

Figure 19:
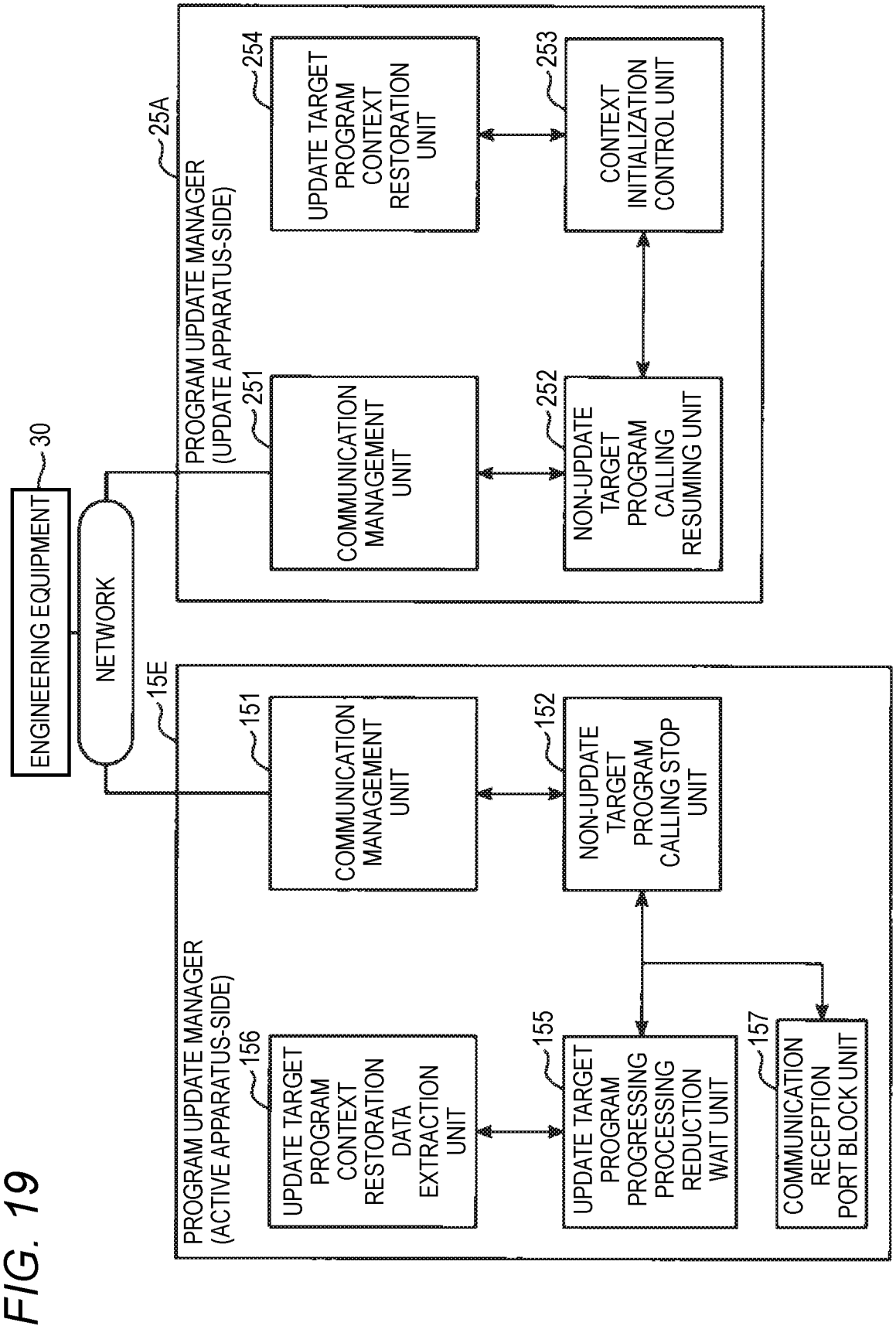
FIG. 19 is a functional block diagram depicting detailed functional configurations of program update managers (an active apparatus side and an update apparatus side), in the seventh exemplary embodiment of the present disclosure.

FIG. 19 is a functional block diagram depicting detailed functional configurations of program update managers (an active apparatus side and an update apparatus side), in the seventh exemplary embodiment of the present disclosure. In FIG. 19, the configurations corresponding to the configurations shown in FIG. 10 are denoted with the same reference numerals. As shown in FIG. 19, in the seventh exemplary embodiment, a program update manager 15E of the active apparatus has such a configuration that a communication reception port block unit 157 is added to the program update manager 15C of the active apparatus shown in FIG. 10. In the meantime, the program update manager 25A of the update apparatus has the same configuration as that shown in FIG. 10.

The communication reception port block unit 157 is similar to that shown in FIG. 16. That is, when there is a request from the non-update target program calling stop unit 152, the communication reception port block unit 157 immediately blocks a reception port of the communication driver (for example, the update target program PB18 shown in FIG. 18) so that a request for new processing is not to be received from an external device (for example, the communication partner apparatus 40). In the meantime, the reception port of the communication driver is blocked by the communication reception port block unit 157 that uses a function of the operating system 12 to operate a reception interruption mask, for example.

<Program Update Method>

Figure 20:
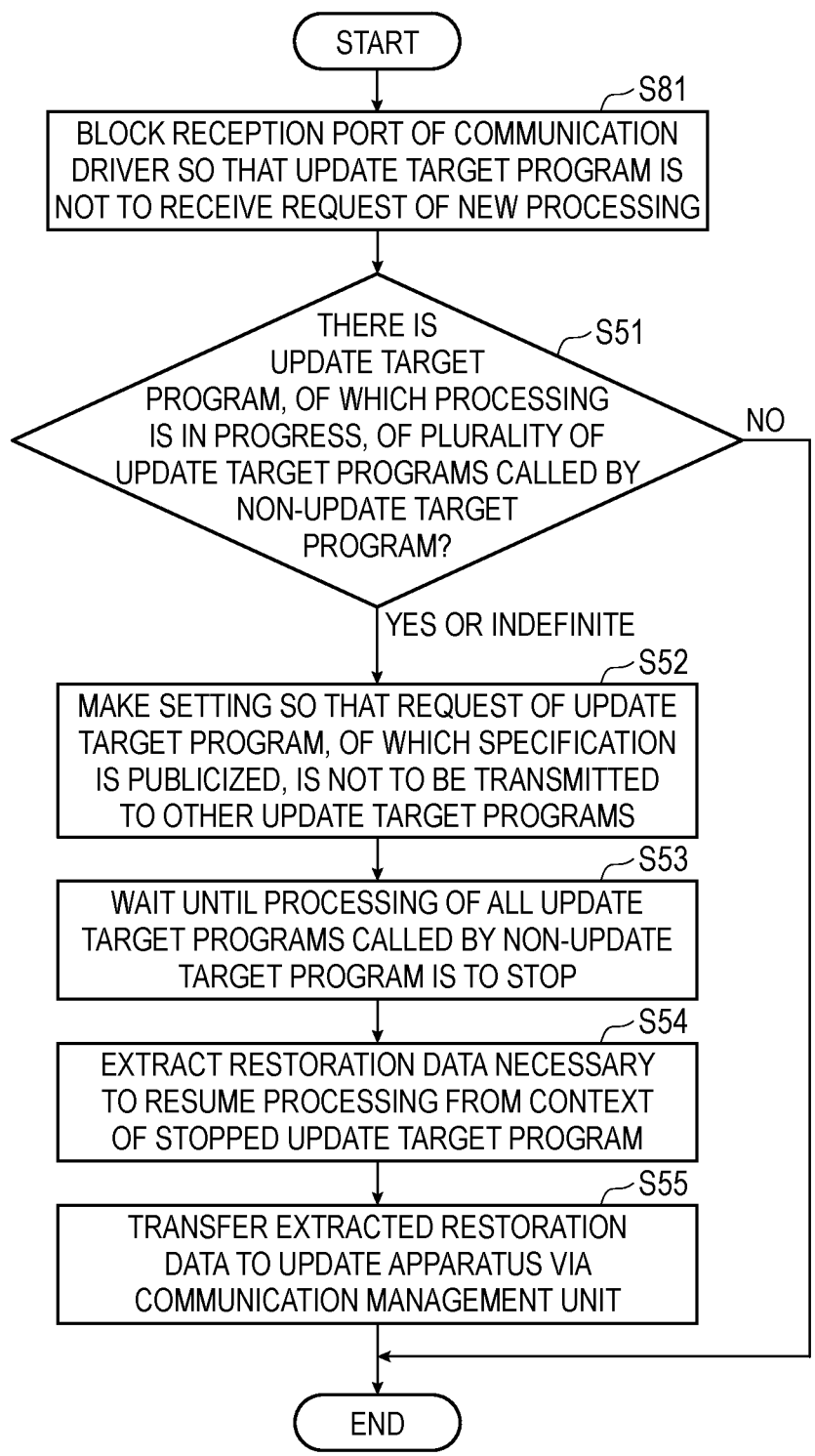
FIG. 20 is a flowchart depicting a program update method in accordance with the seventh exemplary embodiment of the present disclosure.

FIG. 20 is a flowchart depicting a program update method in accordance with the seventh exemplary embodiment of the present disclosure. In the meantime, the flowchart shown in FIG. 20 depicts processing that is to be executed by the update target program progressing processing reduction wait unit 155, the update target program context the restoration data extraction unit 156, and the communication reception port block unit 157 provided in the program update manager 15E. The processing of the flowchart shown in FIG. 20 is executed between step S12 and step S13 in FIG. 5.

When the processing of step S12 shown in FIG. 5 is executed, the non-update target program PA11 is paused. Specifically, the non-update target program PA11 is paused at timing immediately before calling the non-update target program PA11 from the calling-side update target program PC11 or immediately after returning to the calling-side update target program PC11 from the non-update target program PA11. When the non-update target program PA11 is paused, the communication reception port block unit 157 is requested to start processing from the non-update target program calling stop unit 152. Then, the communication reception port block unit 157 immediately executes processing of blocking the reception port of the communication driver so that the communication driver (the update target program PB18 shown in FIG. 15) is not to receive a request for new processing (step S81).

When the processing of blocking the reception port of the communication driver is completed, the similar processing (processing of steps S51 to S55) to the processing of the flowchart shown in FIG. 11 is executed. Meanwhile, in the functional blocks of FIG. 18, the update target program of which specification is publicized is the update target programs PB17 and PB19 (communication between tasks). For this reason, in the processing of step S52, the update target program progressing processing reduction wait unit 155 executes following processing.

That is, processing of making a setting so that a request of the update target program PB17 (communication between tasks) is not to be transmitted to the non-update target program PA11 and the update target program PB12 (relay task) is executed. Also, processing of making a setting so that a request of the update target program PB19 (communication between tasks) is not to be transmitted to the non-update target program PA12 (relay task) and the update target program PB18 (communication driver) is executed.

When the processing of the flowchart shown in FIG. 20 is over, the processing (step S13 in FIG. 5) of transferring the context CA11 of the non-update target program PA11 to the process control apparatus 20 and the processing (step S14 in FIG. 5) of notifying the engineering equipment 30 of the pause completion are sequentially executed in the communication management unit 151. Also, in the process control apparatus 20, the processing of resuming the non-update target program PA11 (non-update target program PA21) is executed in the similar manner to the fourth exemplary embodiment.

As described above, in the seventh exemplary embodiment, when the non-update target program PA11, which is not an update target, is paused in the process control apparatus 10 (active apparatus), based on the pause request from the engineering equipment 30, the communication reception port block unit 157 blocks the reception port of the communication driver (the update target program PB18 shown in FIG. 18), and then executes the similar processing to the fourth exemplary embodiment. Thereby, even when there is the communication partner apparatus 40, it is possible to update the update target program short time while guaranteeing the continuation operation of the process control system 1.

[Application Examples of Process Control System]

Figure 21:
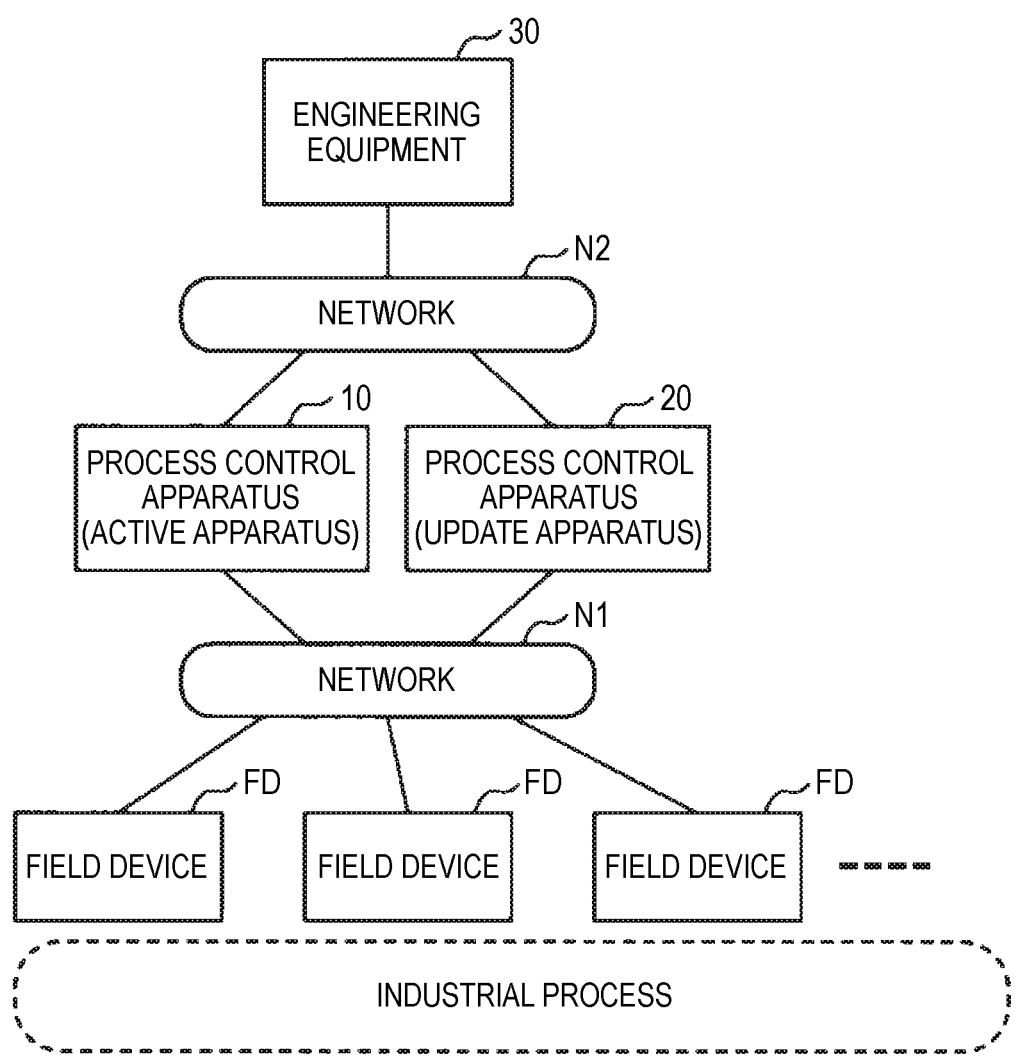
FIG. 21 is a block diagram depicting an example in which a process control system in accordance with an exemplary embodiment of the present disclosure is applied to a system configured to control an industrial process.

FIG. 21 is a block diagram depicting an example in which a process control system in accordance with an exemplary embodiment of the present disclosure is applied to a system configured to control an industrial process. As shown in FIG. 21, the process control apparatus 10 (active apparatus) and the process control apparatus 20 (update apparatus) are connected to a plurality of field devices FD via a network N1. The field devices FD are devices configured to measure diverse states in the industrial process of a plant or the like, and to control the states. Specifically, the field device FD is a sensor such as a flowmeter, a thermometer, a hygrometer and a pressure gauge or a device such as a valve, a pump and an actuator, for example. Also, the process control apparatuses 10 and 20 are connected to the engineering equipment 30 via a network N2.

The non-update target programs PA11 mounted in the process control apparatuses 10 and 20 are input with data (process values) collected from the field devices ED, and are configured to perform calculations for HD control and sequence control, simulation processing or the like. The non-update target program PA11 is configured to operate the field devices FD and to enable the same to perform outputs to the other control apparatuses, in accordance with calculation results and processing results. At this time, the non-update target program PA11 may call the update target program so as to use functions provided by the operating system 12 or the like. In this way, the process control apparatuses 10 and 20 perceive the states of the industrial process, and control the states of the industrial process to desired states.

Hereinafter, the processing of updating the update target program of the process control apparatus is described. At first, the process control apparatus 10 operates as an active apparatus, and the process control apparatus 20 stands by as an update apparatus. At this time, the process control apparatus 10 controls the industrial process through the field device FD. The context for process control is held only in the process control apparatus 10, which is an active apparatus, and is appropriately rewritten.

Then, in order to update the update target program, the update target program after update is installed (updated) in the process control apparatus 20, which is an update apparatus, and a necessary test is performed. After completion of the install and test, the active apparatus and the update apparatus are switched at appropriate timing.

Specifically, the engineering equipment 30 instructs the process control apparatus 10 to pause. The program update manager 15 of the process control apparatus 10 stops the non-update target program PA11 and the update target program, in accordance with the instruction from the engineering equipment 30. At this time, the program update manager 15 transfers the context CA11 of the non-update target program PA11 to the program update manager 25 of the process control apparatus 20, which is an update apparatus. Also, when it is necessary to restore the context of the update target program, the program update manager 15 extracts the restoration data and transfers the same to the program update manager 25 of the process control apparatus 20.

After the process control apparatus 10 stops, a period in which neither the active apparatus nor the update apparatus does not operate temporarily occurs. A length of the period is within a predetermined time predesigned (predefined) so as not to influence the industrial process control, and the industrial process continues even within the time period.

The program update manager 25 receives the takeover data (the context CA11, the restoration data) transferred from the program update manager 15, in accordance with the instruction from the engineering equipment 30. Also, the program update manager 25 restores the context and activates the non-update target program PA21 and the update target program, based on the takeover data, in the process control apparatus 20. The non-update target program PA21 and the update target program of the process control apparatus 20 resume the processing of controlling the industrial process, based on the restored context. Upon the restoration and thereafter, the process control apparatus 20 functions as an active apparatus.

In the meantime, as described above, instead of receiving the takeover data and activating the non-update target program PA21 and the update target program in accordance with the instruction from the engineering equipment 30, the program update manager 25 may perform the corresponding operations, in accordance with a message from the program update manager 15. In this case, the engineering equipment 30 does not transmit a message of requesting the resuming to the program update manager 25. Instead, the program update manager 15 also notifies the program update manager 25 of a message of the pause completion.

[Process Control Apparatus]

Figure 22:
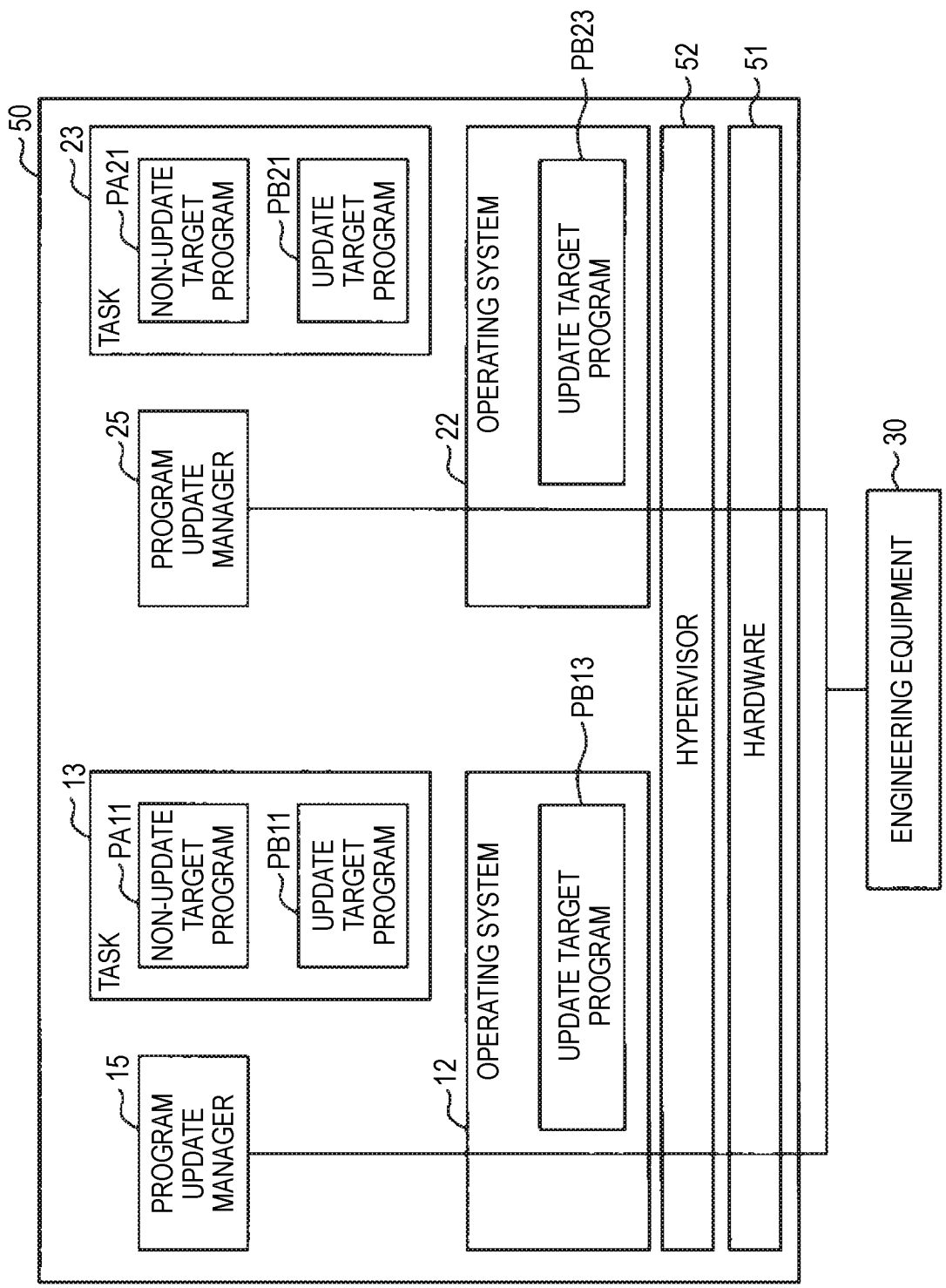
FIG. 22 is a functional block diagram depicting a schematic functional configuration of a process control apparatus in accordance with another exemplary embodiment of the present disclosure.

FIG. 22 is a functional block diagram depicting a schematic functional configuration of a process control apparatus in accordance with another exemplary embodiment of the present disclosure. In FIG. 22, the configurations corresponding to the configurations shown in FIG. 1 are denoted with the same reference numerals. In the first to seventh exemplary embodiments, the two process control apparatuses 10 and 20 are used to perform the update of the program and the shift of the process control apparatus to operate. In contrast, in this exemplary embodiment, the update of the program or the like are performed only with one process control apparatus 50.

As shown in FIG. 22, a process control apparatus 50 of the exemplary embodiment includes a hardware 51 and a hypervisor 52 (program execution unit). The hardware 51 includes a CPU, a memory, an input/output device, a communication device or the like, like the hardware 11 and 21 shown in FIG. 1, and is configured to execute a variety of programs (including the non-update target program and the update target program) to be used in the process control apparatus 50.

The hypervisor 52 is configured to virtually operate on the hardware 51, as a replacement for the hardware, and is provided so as to independently operate the operating system 12, the task 13, the program update manager 15, the operating system 22, the task 23, and the program update manager 25, respectively. That is, the hypervisor 52 is provided so as to independently operate, in one process control apparatus 50, the function operating in the process control apparatus 10 shown in FIG. 1 and the function operating in the process control apparatus 20.

Like this, the exemplary embodiment is different from the respective exemplary embodiments, in that the function operating in the process control apparatus 10 and the function operating in the process control apparatus 20 independently operate in one process control apparatus 50, and the update of the program or the like are performed in the similar manner to the respective exemplary embodiments. For this reason, the detailed descriptions thereof are herein omitted.

As described above, when any one exemplary embodiment is used, it is possible to update the update target program of the process control apparatus in the online state, without breaking off the industrial process.

In the meantime, as described above, the functions of at least some of the process control apparatus, the engineering equipment, the field control station and the field device in the respective exemplary embodiment can be implemented with the computer. In this case, a program for implementing the functions may be recorded in a computer-readable recording medium, and the program recorded in the recording medium may be read and executed by the computer system.

The "computer system" includes the OS and the hardware such as a peripheral device or the like. Also, the "computer-readable recording medium" refers to a portable medium such as a flexible disk, a magneto-optical disk, a ROM, a CD-ROM, a DV-ROM, a USB memory or the like or a storage such as a hard disk incorporated in the computer system. Further, the "computer-readable recording medium" may include one configured to dynamically hold a program for a short period of time such as a communication line used when the program is transmitted via a network such as the Internet or via a communication channel such as a telephone line, and one configured to hold the program for a predetermined time such as a volatile memory inside a server or a client computer system used in this case. In addition, the program may be one for implementing a part of the functions described above, and one capable of implementing the functions in combination with a program already recorded in the computer system.

The process control system, the process control apparatus, and the program update method in accordance with the exemplary embodiments of the present disclosure have been described. However, the present disclosure is not limited to the exemplary embodiments, and can be arbitrarily changed within the scope of the present disclosure. For example, the plurality of exemplary embodiments may be implemented in combinations inasmuch as they can be combined.

For example, in the process control apparatus 50 shown in FIG. 22, instead of the combination of the program update managers 15 and 25, following combinations can also be used. That is, a combination of the program update managers 15A and 25 shown in FIG. 6, a combination of the program update managers 15B and 25 shown in FIG. 8, and a combination of the program update managers 15C and 25A shown in FIG. 10 may be used. Also, a combination of the program update managers 15D and 25 shown in FIG. 16 and a combination of the program update managers 15E and 25A shown in FIG. 19 may also be used.

Also, in the plurality of exemplary embodiments, the configurations of the process control system and the process control apparatus have been described. However, the configurations of the exemplary embodiments can be applied to any of other systems. In this case, preferably, a program corresponding to the non-update target program PA11 in the exemplary embodiments is called with a predetermined time period from a program corresponding to the calling-side update target program PC11 (refer to FIG. 3) in the exemplary embodiments, and performs predetermined calculation processing.

Also, in the plurality of exemplary embodiments, the operating system may be an installation OS for controlling an installation system, or may be a universal OS for controlling a universal computer. Also, in the exemplary embodiments, the execution unit of the processing that is managed under the operating system is referred to as "task". However, even in a case in which the task is replaced with "process", the configurations of the exemplary embodiments can be applied.

What is claimed is:

1. A process control system, comprising:
a first process control apparatus; and
a second process control apparatus,
wherein the first process control apparatus comprises:
a first program execution unit configured to execute a non-update target program which is not an update target and an update target program which may be the update target, and
a first program update manager configured to pause the non-update target program based on a pause request from an outside, and to transfer a context of the non-update target program to the second process control apparatus, and
wherein the second process control apparatus comprises:
a second program execution unit configured to execute the non-update target program and the update target program after update, and
a second program update manager configured to restore the context of the non-update target program by using the context transferred from the first program update manager, to initialize a context of the update target program, and to cause the second program execution unit to resume the non-update target program and the update target program after update, based on a resuming request from the outside.

2. The process control system according to claim 1, wherein when it is determined that processing of the update target program requested by the non-update target program is in progress, the first program update manager is configured to set an execution position of the non-update target program to a position immediately before a request for the processing of the update target program, and to delete information indicating that the processing of the update target program is in progress.

3. The process control system according to claim 1, wherein when it is determined that processing of the update target program called by the non-update target program is in progress, the first program update manager is configured to wait until the update target program completes the processing in progress.

4. The process control system according to claim 1, wherein when it is determined that there is an update target program of which processing is in progress among update target programs called by the non-update target program, the first program update manager is configured to:
make a setting to prevent a request of a pre-registered update target program among the update target programs from being transmitted to the other update target programs;

wait for the processing of the update target program to stop; extract restoration data necessary to resume processing from a context of the pre-registered update target program after the processing of the update target program stops; and transfer the extracted restoration data to the second process control apparatus, and the second program update manager is configured to restore the context of the preregistered update target program after update by using the restoration data transferred from the first program update manager.

5. The process control system according to claim 2, wherein when a response indicative of a result of a first predetermined processing and a request of a second predetermined processing are received in response to a request for the first predetermined processing, the update target program is configured to perform communication with other apparatuses by using a request/response protocol for notifying of a response indicative of a result of the second predetermined processing.

6. The process control system according to claim 2, wherein when the update target program is a communication driver for enabling communication with other apparatuses, the first program update manager is configured to block a reception port of the update target program such that a new request is not to be received from the other apparatuses.

7. The process control system according to claim 4, wherein the pre-registered update target program is a system call or a common library of which specification is defined and publicized.

8. A process control apparatus, comprising:

a program execution unit configured to execute a non-update target program which is not an update target and an update target program which may be the update target;

a first program update manager configured to pause the non-update target program based on a pause request from an outside, and to transfer a context of the non-update target program; and a second program update manager configured to restore the context of the non-update target program by using the context transferred from the first program update manager, to initialize a context of the update target program after update, and to cause the program execution unit to resume the non-update target program and the update target program after the update, based on a resuming request from the outside.

9. A program update method in a process control apparatus, the program update method comprising:

executing a non-update target program which is not an update target and an update target program which may be the update target;

pausing the non-update target program based on a pause request from an outside, and transferring a context of the non-update target program to the process control apparatus; and restoring the context of the non-update target program by using the context transferred to the process control apparatus, initializing a context of the update target program after update, and resuming the non-update target program and the update target program after update, based on a resuming request from the outside.

10. The program update method according to claim 9, wherein pausing the non-update target program and restoring the context of the non-update target program are executed in the same process control apparatus.

11. The program update method according to claim 9, wherein pausing the non-update target program and restoring the context of the non-update target program are executed in different process control apparatuses.

* * * * *